Jan. 26, 1943.　　　F. F. HILLIX　　　2,309,588
APPARATUS FOR LAPPING AND POLISHING OPERATIONS
Filed May 18, 1938　　　11 Sheets-Sheet 6
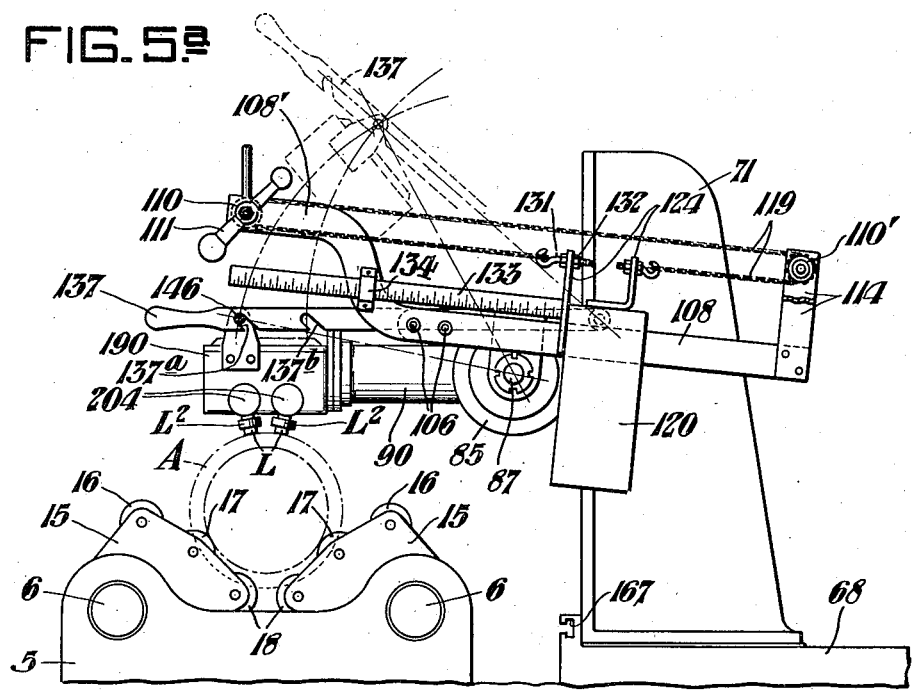
FIG. 5ª
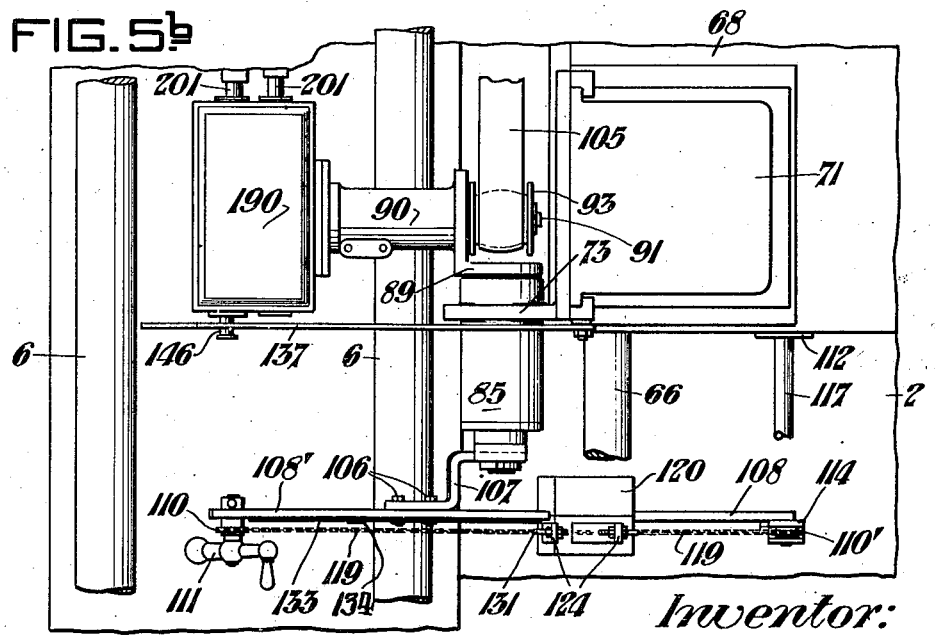
FIG. 5ᵇ
Inventor:
FOSTER F. HILLIX,
by: John E. Jackson
his Attorney

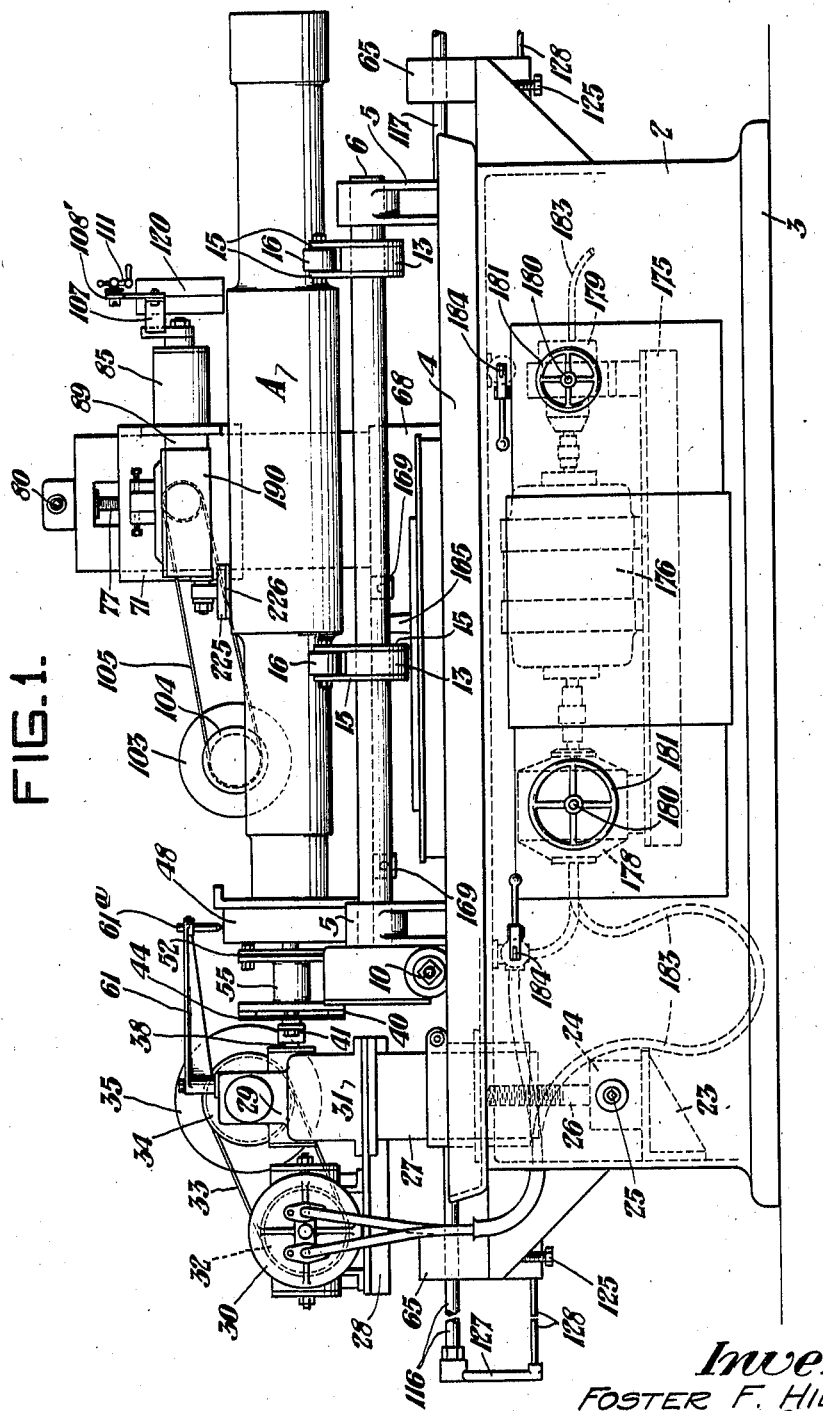

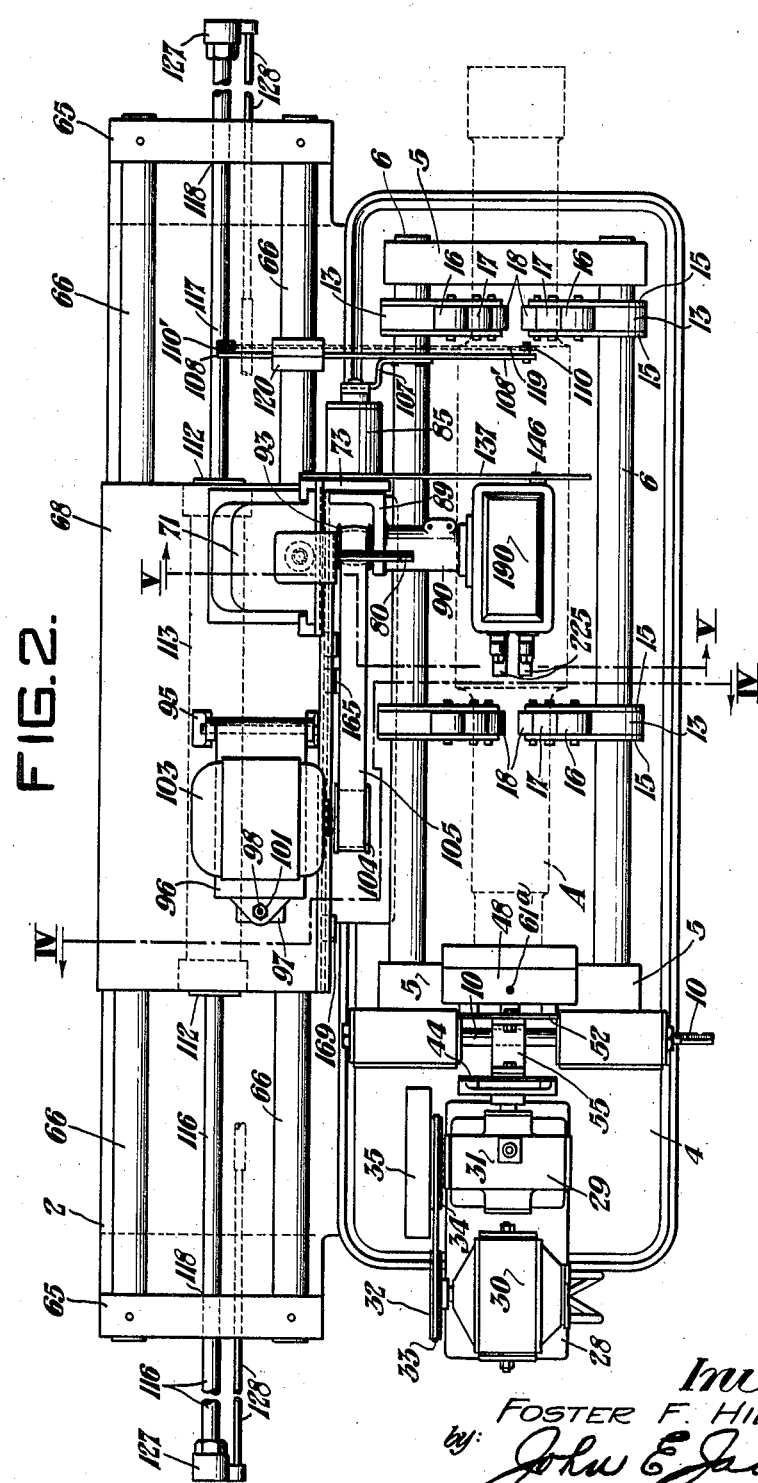

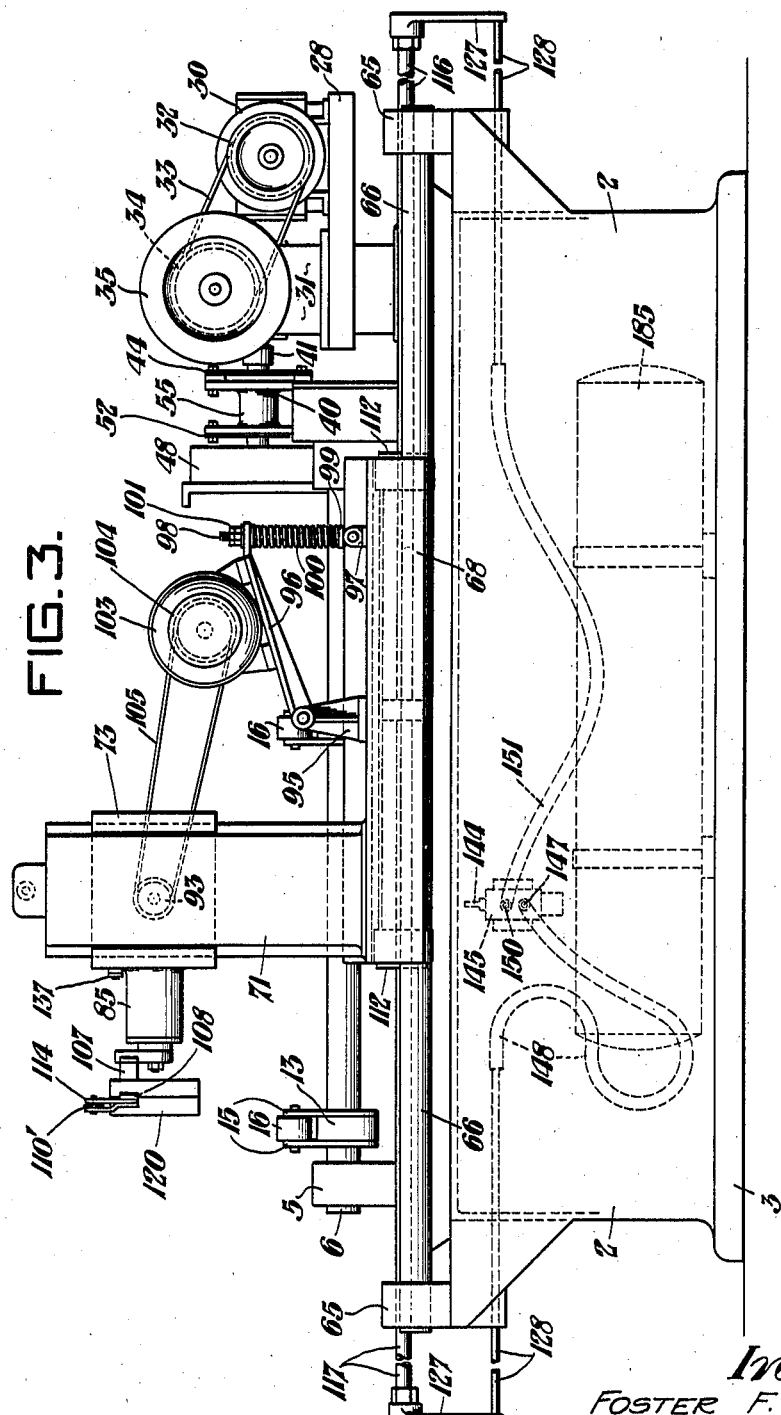

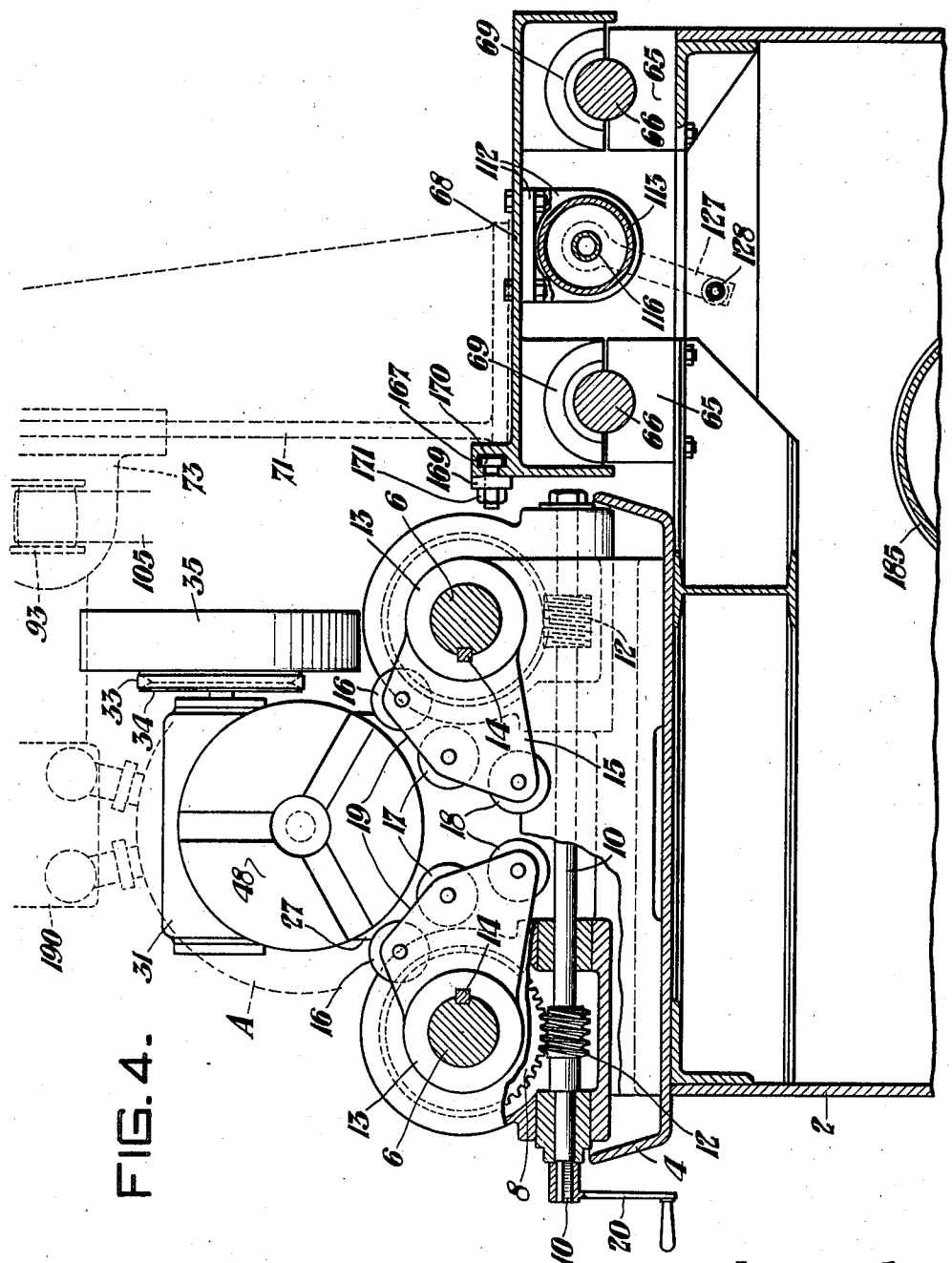

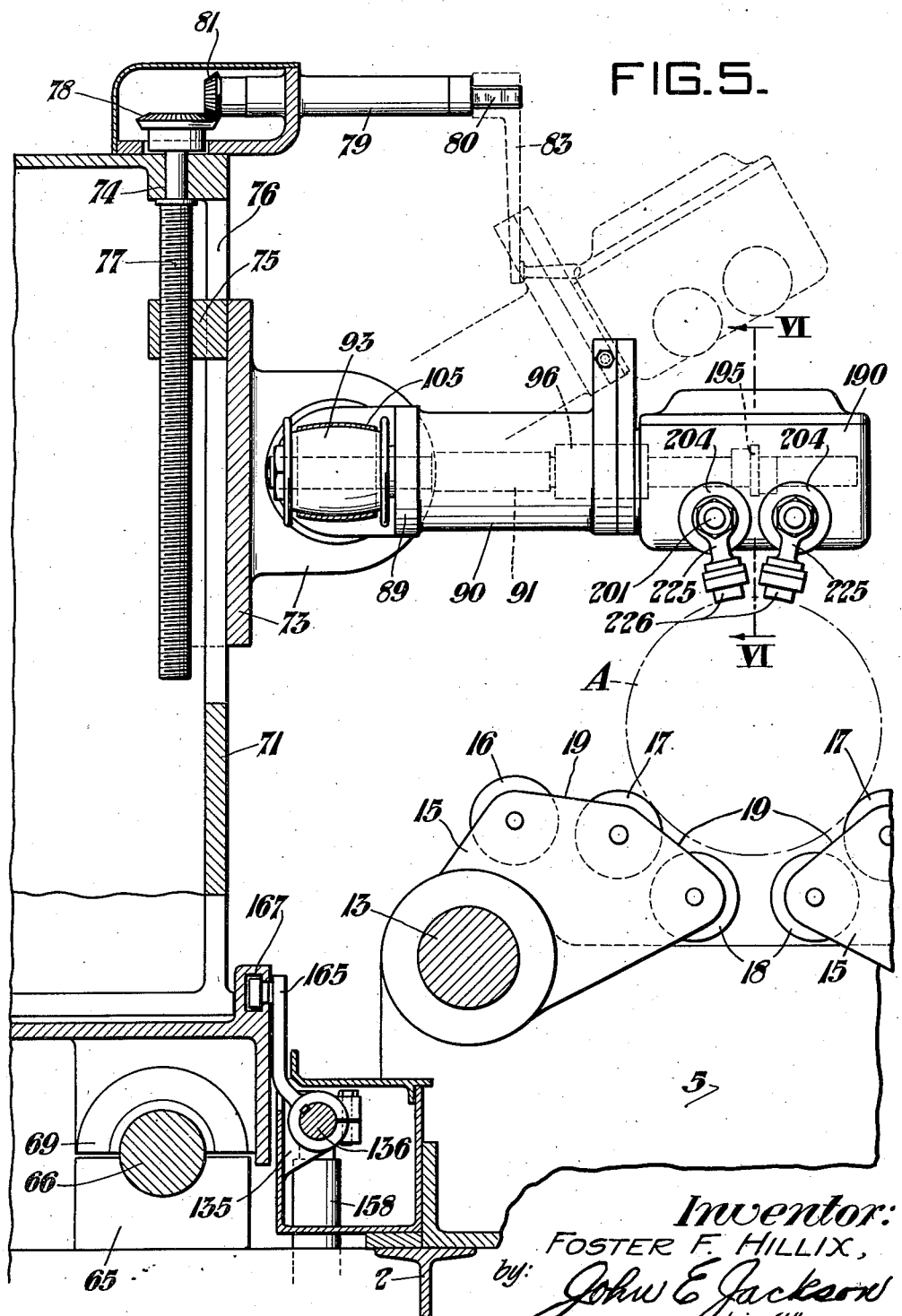

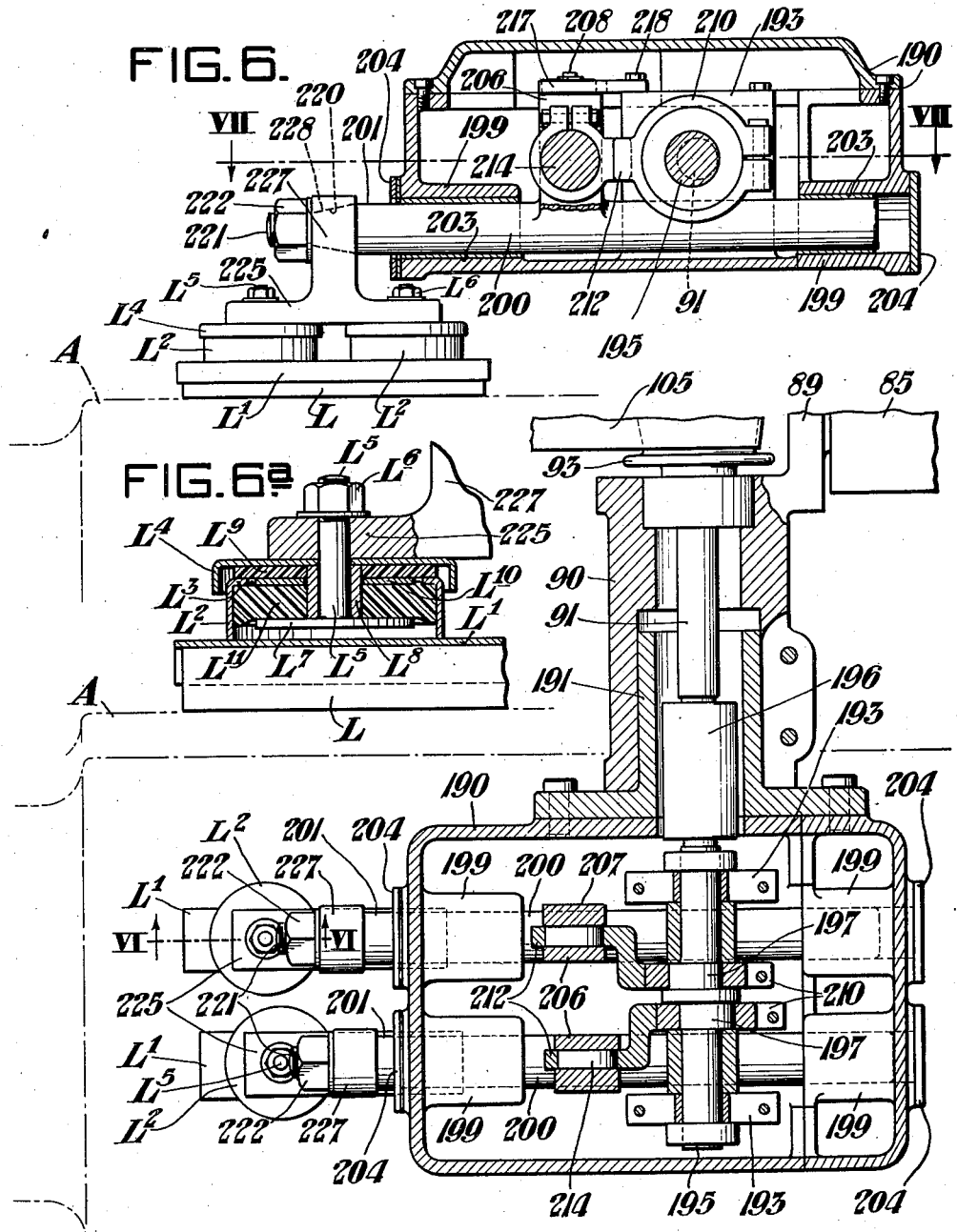

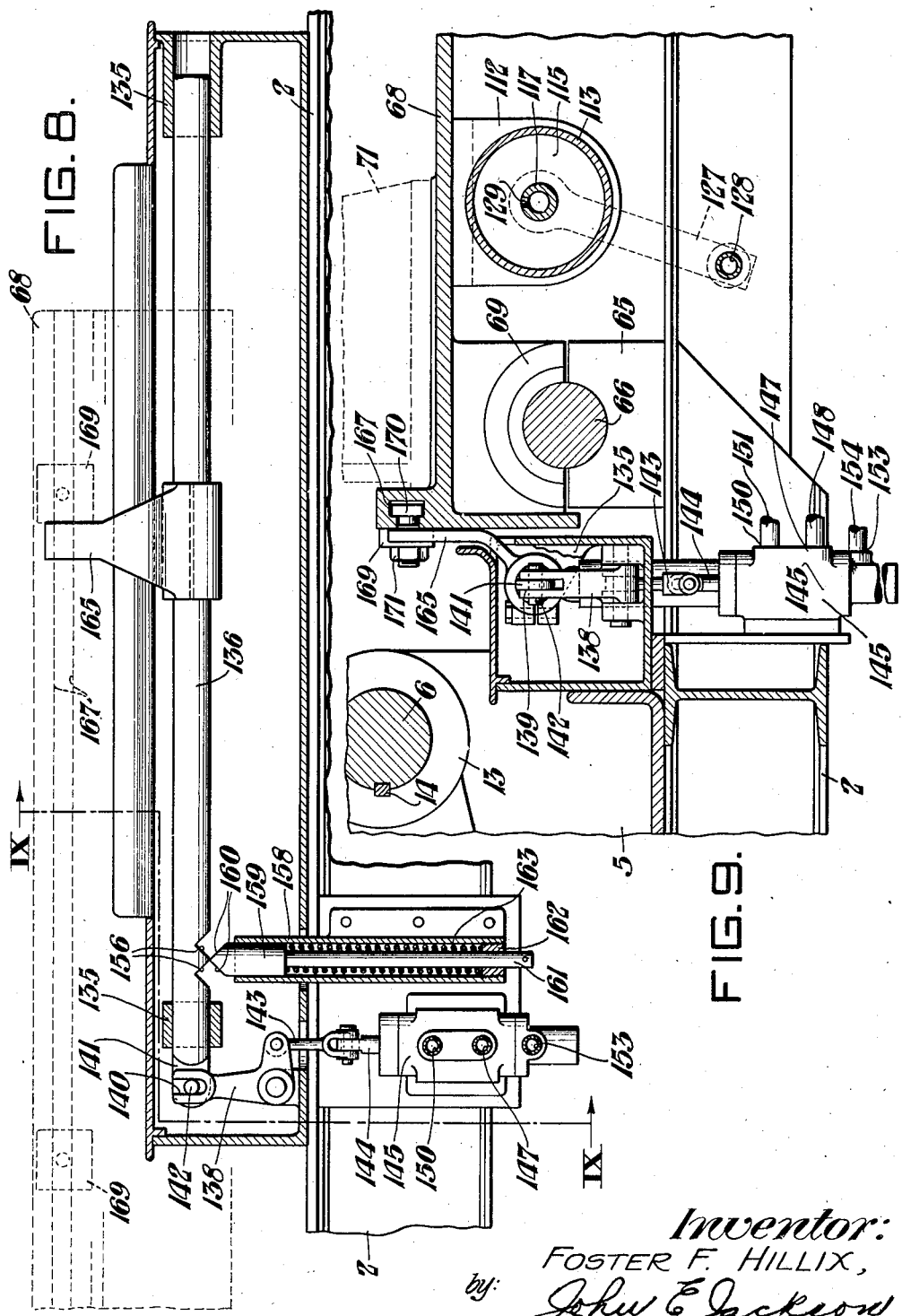

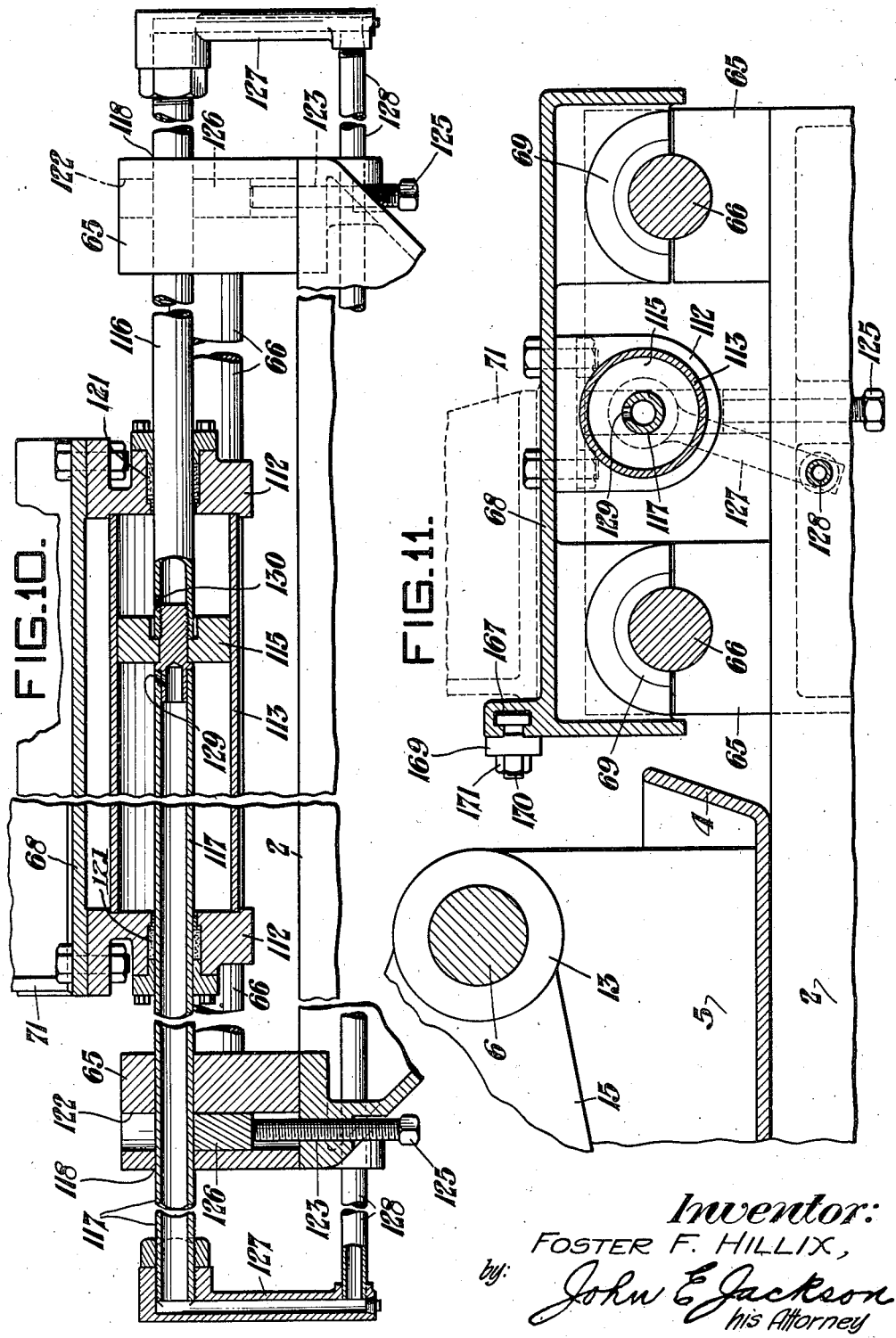

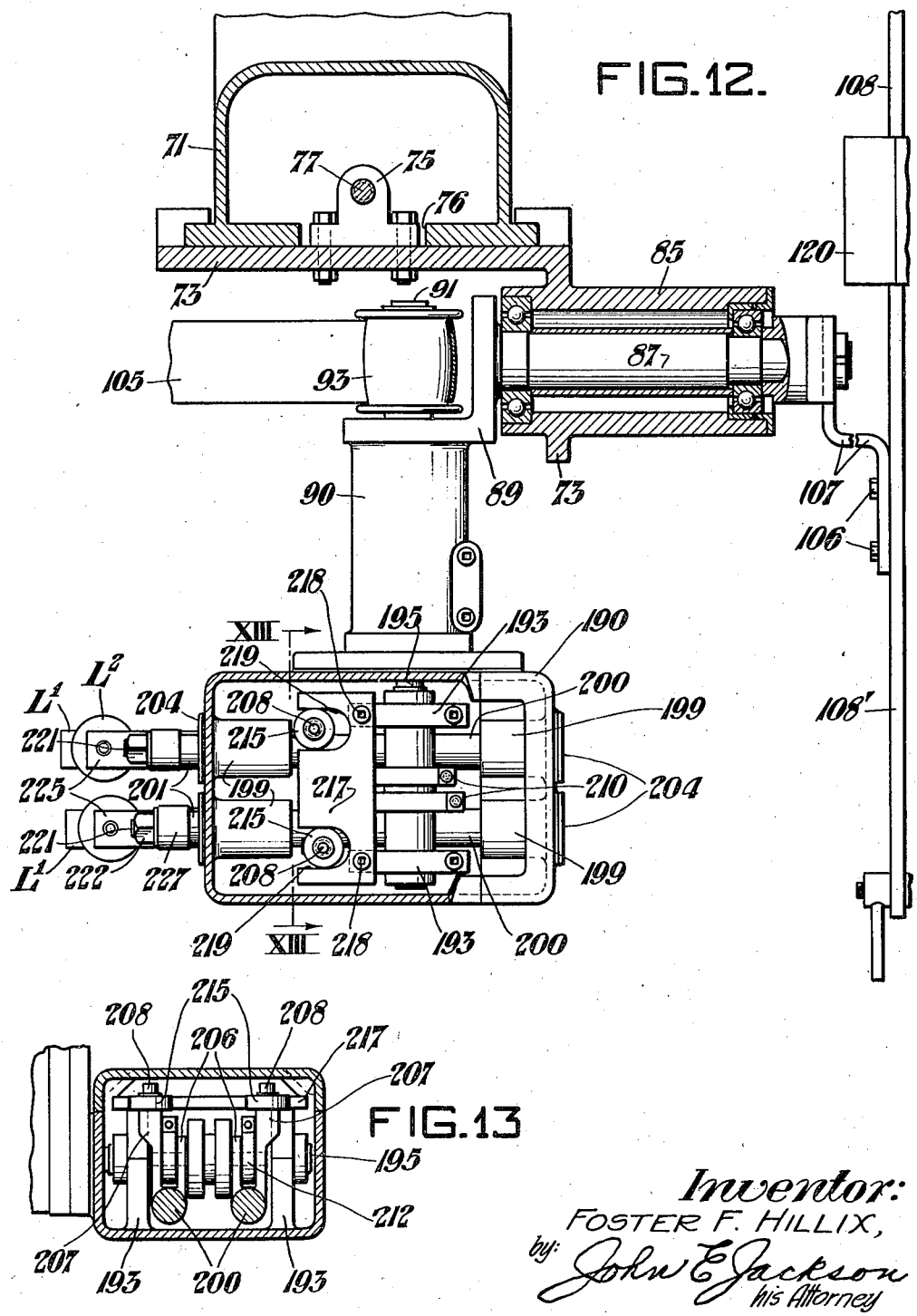

Patented Jan. 26, 1943

2,309,588

UNITED STATES PATENT OFFICE 2,309,588

APPARATUS FOR LAPPING AND POLISHING OPERATIONS

Foster F. Hillix, Lakewood, Ohio, assignor to The American Steel and Wire Company of New Jersey, a corporation of New Jersey Application May 18, 1938, Serial No. 208,661

9 Claims. (Cl. 51—59)

This invention relates to the production of substantially perfectly smooth surfaces, and, more particularly, relate to the production of mirror finishes on hard objects, such as, steel metal-working rolls, glass, etc.

Although the inventive teachings that are to follow will find application in many fields wherein highly polished, mirror-like surfaces are necessary or desirable, they specifically are directed to that art of finishing metal-working rolls, particularly cold metal-working rolls, wherein the surface characteristics of the latter are reproduced in complement to an infinitesimal degree upon the surface of the work-piece. However, though so directed, it is not intended that the invention shall be limited to the particular field of finishing metal-working rolls, as will become apparent after the claims appended hereto have been considered.

There are instances in the manufacture of rolled metal products, and particularly, in products that are to be subsequently plated, as in the case of chromium- or nickel-plated cold rolled strip steel, where the perfection of finish on the surface of the work falls far short of actual requirements. Plated objects, due to the lustrous mirror-like finish usually sought, are prone to magnify every defect in the surface of the underlying metal to the extent that those minute imperfections, passing unnoticed to the naked eye on the surface of the unplated metal, become quite noticeable defects after plating. Because of this, many otherwise sound pieces of plated stock, or stock to be plated, must be rejected, and production costs are thereby objectionably enhanced.

For these reasons, it has, in the past, been customary to prepare the surface of work-pieces for plating, after the rolling and processing steps are done, by polishing, whereby the more obvious defects are eliminated, and the work-pieces made suitable for the platers. Such polishing operations require extra time, labor, materials and equipment, and although the rejection scrap is minimized thereby, the production costs are not materially improved.

Investigation has revealed that surface imperfections on the rolled metal work-pieces come, for the most part, from the surface of the rolls through which they have passed. The minute irregularities in the form of projections and declivities that constitute the surface contours of the roll surface are reproduced in reverse or complementary relief upon the surface of the work-pieces. An unsatisfactory finish results which necessitates further treatment of the work-pieces, as has already been indicated. In view of the thoroughness and fidelity with which surface characteristics are transferred from rolls to work-pieces, it was obviously concluded that, if the surface defects of the rolls could be obviated, the surface characteristics of the stock rolled therethrough should show an improvement to a corresponding degree.

The present invention had its inception in the answer to the problem of how to improve the surface of metal-working rolls, and how to attain as nearly a true mirror finish as practicable thereon.

Roll grinding and polishing practices in the past have been productive of surfaces that appear to the naked eye to be perfectly smooth. Closer inspection reveals, however, that such surfaces, far from being smooth, possess very definite imperfections, usually conforming to some pattern, as scratches running circumferentially of the roll, which further recourse to the conventional grinding and polishing operations fails to eliminate, and quite frequently aggravates.

It is necessary to have an understanding of the conditions and reasons underlying the disadvantageous results obtained from conventional polishing and grinding, before a clear understanding and appreciation may be had of that which is to follow. For this reason a few words will be said in explanation of previous methods, leading up to a comparison with the methods hereinafter set forth.

As is well known to the polishing industry, every surface, no matter how smooth in appearance to the casual observer, is, in fact, composed of many microscopic humps and hollows. It is the job of one seeking to make as smooth and level a surface as possible (a perfect surface being hereinbefore and hereinafter represented as a true "mirror") to remove the humps relative to the hollows, whereby a level condition is attained. This may be done in either one of two ways: (1) By forcing portions of the humps into the hollows, and removing the excess, if any, thus arriving at a surface that represents a mean level of all humps and hollows; or, (2) By cutting away the humps until the entire surface is at the level of the bottoms of the hollows. The former of these methods is known as "burnishing" and is inherent in substantially all grinding and polishing operations, as will later appear, and the latter, though possibly loosely known as a variation of polishing, is technically called, and properly known as "lapping."

The differences characterizing polishing and lapping are not only those reflected in their respective results, but are also those of instrumentalities and procedure.

Polishing may be said to be a refined form of grinding in that it is carried out, as in the case of the latter, with an abrasive wheel that is rapidly rotated and held against, and traversed across, the surface to be treated with considerable pressure. The abrasive grain is charged into the periphery of the wheel and held or "fixed" there by a suitable binder, and the grain size is relatively coarse; i. e., of a size to pass a screen having 600 meshes per square inch. On any surface that is of greater curvature than the wheel's cicumference, or one that is flat or convex, the contact between the wheel and the work is substantially linear, and the travel of the wheel across the work is usually such as to introduce its cutting action in one direction, whereby all cuts made by the wheel are substantially parallel. Particularly is this true in the case of a cylindrical surface, which must be rotated past the wheel to present all of its surface thereto. Thus, a rolling mill roll, when polished conventionally, will be found to have a surface with cuts running generally circumferentially, and, as it is said, with the "grain laid down in one direction" about the roll. Such a surface marking is called "pattern," and, in this case, the pattern is that which is characeristic of polishing.

Further application of the polishing wheel to improve the surface, causes the fixed grain to track into the cuts formerly made by it, whereby the bottoms are dug deeper and the surface irregularities are aggravated. Accompanying this action there follows the burnishing action referred to hereinbefore, wherein the high points of the humps are forged over into the hollows at least partially to fill the same. Though this affords a surface that even under close inspection appears to be fairly smooth, it, in fact, is an artificial and weak surface, which, under the application of working pressures incident to the rolling of metal, caves in or breaks down and becomes worse than if the additional polishing and burnishing had not been resorted to.

Because polishing requires that the wheel be applied to the work-surface under considerable pressure, difficulty is encountered in relatively large particles tearing from the work or cracking loose from the wheel, which, upon coming into the zone of the work, cause gouges or grooves in the work-surface, and thereby create "new bottoms" down to which the entire surface must be averaged before a good polishing job may be had. This difficulty is commonly referred to as the development of "wild grains" and constitutes one of the most troublesome factors in polishing operations.

Another difficulty that is quite prevalent in conventional polishing operations is that arising from the line contact between the polishing wheel and the work-surface when combined with the polishing pressures and periodic motion incident to the mechanical movements of the polishing operation. These factors combine to cause the polishing wheel to get out of round, which results in "chatter marks" being developed on the surface of the work. Before such marks can be eliminated by further polishing, the conditions are usually such as to cause the formation of other marks, which marks, in themselves, constitute one of the factors contributing to the periodic vibration of the machine, and which cause an aggravation of the condition rather than a correction thereof.

It will be seen from the foregoing paragraphs that there are several undesirable features in conventional polishing operations which stand in the way of attaining mirror-like surfaces by this method. The line contact and the unidirectional cut, while removing material from the high points of the surface, do not preclude the bottoms or valleys from being cut still deeper, and the ultimate result is that very little is to be gained by repeated polishing. The wild grain which develops from the pressures necessary in the polishing operation cause scratches of a greater magnitude than those provided by the regularly sized abrasive, requiring much additional work to eliminate the damage thus done. The polishing wheel's becoming lop-sided is responsible for the formation of "chatter marks" and this difficulty can scarcely be circumvented without departing from the principles and instrumentalities of polishing. The grain becomes dull and tends to forge over the surface humps rather than to cut them away, and this, for the most part, causes a surface having much of the metal thereof in an unsupported condition, which caves-in upon being subjected to working pressures. In short, it may be said that the conditions in any polishing operation are as ideal as they can be made only at the beginning of the operation, and that all of the changes that must necessarily take place as the operation progresses are changes for the worse, and the general method and work done degenerates from perfection rather than coming nearer to perfection as the work progresses.

Although, it is possible to grind and polish surfaces to an accuracy well within one-thousandth of an inch—sometimes ten-thousandths—true mirror surfaces are much more accurate than this. Hence, mirror-like surfaces in the prior art have been attained, not by resorting to polishing operations, but, rather, by utilizing the manual system known as lapping, which is based upon the elimination of most of the undesirable factors discussed above. Inasmuch as it is essential to obviate line contact and unidirectional cuts on the work-surface, lapping is accomplished by employing a block that presents a substantial area of contact to the work, which may be moved in any direction so as to traverse the work-surface at any desired angle.

In conjunction with such a block, it has heretofore been customary that fine abrasive be fixed to the working face thereof; i. e., abrasive, the "fines" of which grade down to a size equivalent to that which will remain suspended in still water from 200 to 600 minutes, and even longer. These instrumentalities permit the use of relatively light working pressures, whereby cracking and spalling of the block, and the formation of wild grain incident thereto, is partially done away with. The grain size, being substantially smaller, has the advantage of affording a cleaner cut and of remaining in sharp condition longer than the coarser sized abrasives employed in polishing, whereby burnishing is eliminaed practically altogether.

From these factors, a mirror-like surface may be closely approached by virtue of the fact that the lapping-block rides upon the tops of the humps on the work surface, and the grain size is insufficient to penetrate to the bottoms of the hollows to cause the routing action referred to in polishing operations. The motion imparted to the block is such as will afford crossing previous cuts at a substantial angularity whereby the tendency for the grain to track in the previous cuts and make new bottoms, is nearly obviated. Furthermore, the lapping-block, instead of becoming out of conformance with the work surface, as is the case in polishing when the wheel gets out of round, becomes more adapted thereto as the work progresses, whereby "chatter marks" and other similar objectionable patterns rarely arise. The net result is that the humps of the work-surface are completely leveled off to a common bottom, beneath which only sound metal lies, and the evils of "cave-in," usually growing from burnishing operations, are non-existent.

In so far as metal-working rolls are concerned, there are, among many others, three good reasons for providing as nearly a perfect surface thereon as possible, some of which have been touched upon hereinbefore. These are:

1. The accuracy of finish of the roll surface is reproduced in the same degree upon the surface of stock rolled therethrough.

2. Rolling mill rolls so treated may be used from 10 to 100 times longer before refinishing becomes necessary. This means that the cost of the operation is absorbed and the entire method is rendered economically feasible.

3. Roll surfaces of this kind are not affected by stock rolled therethrough so that the streaking effect usually encountered upon conventional roll surfaces (which is defined by the circumferential points at which the edges of the stock come in contact with the roll) is practically eliminated. This means that, whereas formerly metal stock, such as strip, had to be rolled in a definite order, commencing with the widest stock and finishing with the narrowest stock, to avoid streaking, the lapped surfaces on the rolls provide that stock may be rolled indiscriminately of width, whereby production schedules are more readily adaptable thereto.

The above reasons have been the cause of many attempts to provide suitable methods of lapping on a commercial scale. Heretofore, lapping operations have been accomplished only by painstakingly slow manual work, and have been unsuited to such commercial adaptation. Attempts to provide automatic means for lapping have failed to be successful in view of the extreme sensitivity of the procedure, and the necessity for such refinement of control, and total absence of extraneous motion and pressures, as may only be had from the delicate manipulation of a skilled artisan in this field.

Moreover, before an automatic, commercial adoption of lapping could be achieved, still other obstacles remained to be surmounted. It was discovered that, even in the case of lapping, there was still some prevalence of wild grains; i. e., particles would still cut and bunch from the work-surface, or break from the block, and gouge out the surface to such an extent that hours of additional work would be required to bring the work down to the new bottom thus formed. One of the age-old tenets of the art of lapping stood directly in the path of solving these difficulties. The use of fixed grain has heretofore been considered axiomatic in this art, so necessary was it thought to be in view of the difficulties attendant upon the use of loose grain. Loose grain was avoided because of control difficulties, which included the absence of means to feed it properly to the zone of work whereby scratching and scoring resulted. But the answer was found to lie in the use of loose-grain, taken in conjunction with blocks of the right size, shape, and hardness, and also in conjunction with a "scavenger" solution in the lubricant; a scavenger being an additive agent for lubricants which cleanses the work of cuttings and precludes worn abrasives.

The principal difficulty encountered in perfecting the present invention remained the one of wild grains. Study proved that the prevalence of these, as is the case in polishing, was caused by disintegration of the blocks under operating conditions, and by the seizure of surface particles to the block, which would tear loose and bunch with the cuttings to form the hard wild grains. Lubricants minimized the seizing, but failed to obviate bunching of the cuttings, or disintegration of the blocks.

These latter difficulties were found to be directly attributable to the fixed abrasive grain. Far better operating conditions and results were obtained when loose abrasive grain was finally employed, but it was not until a suitable scavenging agent was added to the lubricant that wild grains (those arising from bunched cuttings) were totally eliminated. The scavenger reduces the affinity of the particles for each other; acts as a dispersant, and, aside from cleansing the work to prevent bunching and keeping the grain sharp, functions to keep the grain one particle thick between the block and work-surfaces.

The manner by which loose-grain was ultimately fed to contribute to the success of this invention, and the theories and principles believed to underlie the operations in accordance therewith, are fully set forth hereinafter under the caption "The method."

Accordingly, the present invention has for its primary object the provision of methods and means for automatically producing mirror-like surfaces upon articles, and, particularly, it pertains to the provision of such surfaces upon metal-working rolls.

It is another object hereof to provide a method and apparatus for automatically lapping surfaces to a high degree of perfection, and to accomplish by mechanical means that which has heretofore been obtainable only through manual operations.

It is still another object to provide a method and apparatus for lapping that can provide a mirror-like finish upon hard surfaces with great rapidity and precision.

It is another object to provide an apparatus and various instrumentalities associated therewith, capable of being controlled to an infinite degree of accuracy, and capable of being compensated to obviate all extraneous movement and periodic vibration while supporting, moving, and acting upon a surface to be finished.

It is another object to provide a machine wherein all the previous difficulties encountered in lapping and polishing operations are eliminated, whereby a controlled and predetermined pattern is obtainable upon the surface of the work-piece.

Many other objects and advantages will become apparent hereinafter when the following description is considered in conjunction with the accompanying drawings, in which:

Figure 1 is a front elevational view of the apparatus of the invention;

Figure 2 is a plan view of the apparatus of Figure 1;

Figure 3 is a rear elevational view of the apparatus of Figures 1 and 2;

Figure 4 is a sectional view on the line IV—IV of Figure 2;

Figure 5 is an enlarged sectional view on the line V—V of Figure 2;

Figure 5a is a fragmentary end elevational view of the right-hand end of the machine;

Figure 5b is a plan view of the apparatus shown in Figure 5a;

Figure 6 is an enlarged sectional view on the line VI—VI of Figure 5;

Figure 6a is an enlarged, fragmentary sectional view taken along line VI—VI, Figure 7;

Figure 7 is a sectional view on the line VII—VII of Figure 6;

Figure 8 is an enlarged fragmentary elevational view of a detail, part of which is shown in section;

Figure 9 is a sectional view on the line IX—IX of Figure 8;

Figure 10 is an enlarged fragmentary elevational view of a detail, part of which is shown in section;

Figure 11 is an enlarged fragmentary elevational view showing another detail;

Figure 12 is a view similar to that of Figure 7, but shows some additional elements of the apparatus of the invention;

Figure 13 is a sectional view on the line XIII—XIII of Figure 12;

Referring now more particularly to the drawings in which like reference characters refer to like parts throughout.

Figure 14:
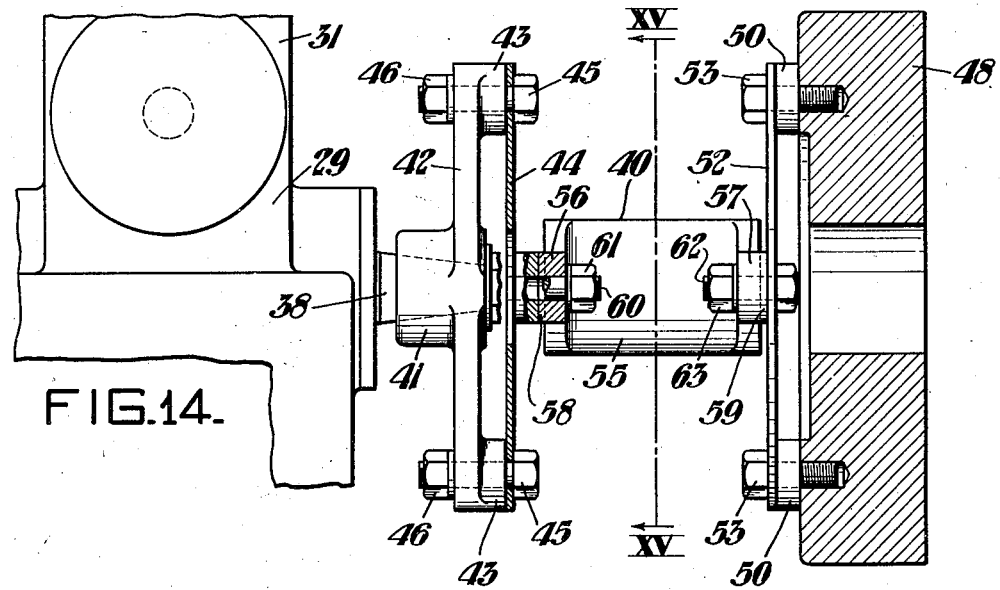
Figure 14 is an elevational view of a detail, part of which is shown in section; and, Figure 15 is a sectional view on the line XV—XV of Figure 14.

The general assembly, as is shown in Figures 1, 2 and 3, is carried within and supported by a housing 2, which is composed of suitable plate sections secured together in any desired manner, as by welding, riveting, bolting, etc., and which are mounted upon a bed or pedestal 3.

Inasmuch as the present apparatus is especially designed to treat cylindrical surfaces, such as metal-working rolls, special work-supporting means have been provided which will now be described.

*Work support*

Referring more particularly to Figures 1, 2 and 4, it will be seen that the top of the front of the housing 2 is closed by a coextensive, shallow pan member 4 within which are disposed two pairs of aligned spaced bearing members 5 so arranged as to journal a pair of shafts 6 in spaced parallel relation to each other and to the long axis of the machine. These shafts are arranged for rotation within their respective bearings for purposes that will become apparent hereinafter.

The shafts 6 are arranged for simultaneous rotation to the same degree of arc, but in opposite directions, by means of gear trains more clearly seen in Figure 4. The gear trains include a pair of worm gears 8, respectively secured to the end of each of the shafts 6, which are arranged to receive rotative effort from a hand driven shaft 10, upon which is rigidly secured a pair of worms 12 of reverse pitch, intergeared, respectively, with each of the worm gears 8.

With further reference to Figures 1, 2 and 4, it will be seen that each of the shafts 6 carries in spaced relation a pair of sleeve members 13 which are slidably keyed thereto, as is shown at 14, for rotation therewith. Integrally affixed to each of the sleeves 13 is a pair of journal plates 15 of special configuration arranged to journal therebetween a series of rollers 16, 17 and 18. The disposition of the journal plates 15 is such as to place each roller in axial alignment with the corresponding roller of the assembly on the same shaft. This obtains in the case of the rollers on either shaft. It will also be seen by further reference to Figure 4 that the side plates carried by the sleeves of the adjacent shafts 6 are disposed to extend toward each other, whereby the axes of rotation of corresponding rollers among the four sets fall, respectively, within common horizontal planes. Thus, all rollers 16 have their axes of rotation in a common, horizontal plane; rollers 17 have their axes in a different common plane, as do the rollers 18, and all of these planes are parallel. The adjacent edges of the side plates are specially formed, whereby the rollers may each be journaled adjacent thereto, with its periphery projecting a substantial distance therebeyond. It should be especially noted that this construction is such as to place each of the rollers in one assembly at a different radial distance from the center of rotation of the shaft 6; one assembly being typical of all. All of the assemblies conform to this arrangement, whereby corresponding rollers fall at corresponding, though opposed, positions upon each side of the mid-vertical plane passing between the shafts 6 in a direction parallel thereto.

This construction has been described at length because of its importance in the proper supporting of a cylindrical body, such as a roll, since experience has indicated that there is probably but one feasible way by which this may be accomplished. The arrangement is such that the sleeves 13, side plates 15, and associated rollers 16, 17 and 18, constitute an adjustable cradle for engaging a cylindrical body, such as a roll, adjacent each of its ends at points 120° apart, and equally spaced on its circumference to each side of the vertical diametric plane of the body. Three rollers have been tentatively illustrated on each of the cradle elements, which, by virtue of their different distances from the axes of rotation of the shafts 6, may be raised or lowered, as the case may be, to support smaller or larger cylindrical bodies, whereby the center axis of each of the latter will fall close to the same horizontal line, and always in the same vertical plane. It will be understood that as between opposite pairs of the cradle elements only two of the six rollers contact the cylindrical body at either end, and these are such as to afford points spaced circumferentially of the body at substantially 120°, as has already been indicated. This means a four point bearing supports the roll.

It will be understood that a suitable hand crank 20 may be disposed on the end of the shaft 10, whereby the latter may be rotated to vary the disposition of the cradle elements, so that, if a large roll is to be accommodated, the uppermost rollers may be moved to a position to engage the roll at points 120° apart along its periphery. If a small roll is to be accommodated, the cradle elements are raised by turning the crank 20 in the opposite direction, so that the lowermost rollers 18 are in position to engage such a roll at points 120° apart on its periphery; it being understood that the rollers 18 are each journaled at equal distance from the axis of rotation of their respective shafts 6, which distance is greater than that of either of the other sets of rollers 16 or 17. It will be further understood that the axis of rotation of each of the rollers 16, 17, and 18, never departs from a plane common to the axis of rotation of each of the other rollers 16, 17 and 18, respectively.

It will be understood that many more rollers may be employed upon each of the cradle elements in order that any number of differently sized rolls or cylindrical bodies may be accommodated. However, it has been found that the rollers of the cradle elements should provide the 120° relationship to any roll reposed therein in order that the latter will be afforded a maximum amount of lateral support without, at the same time, tending to wedge between the cradle elements and resist rotational effort. Furthermore, it is of importance to note that this method of supporting the work accurately positions the latter, whereby all adjustments and movements are eliminated except the one in vertical directions along the mid-vertical plane of the machine. The headstock to drive the work-piece, and the lapping devices for working thereon, are adjustable vertically to compensate for this want of adjustment of the work-support.

The work-support, just described, holds the work immediately above the pan 4, as may have been inferred from the previous description, whereby all sludge, cuttings, oil, etc., are intercepted, and held where they cannot interfere with the cleanliness and proper progress of the work.

Work rotating mechanism

The work is adapted to be rotated as it reposes in the cradle elements, last described, by means of a chuck, headstock, and motor assembly, which will now be described. Within the main housing 2, and as is indicated by broken lines in the lower left-hand corner of Figure 1, is disposed a bracket member 23 arranged to support an elevating screw 24. The screw is provided with a raising column 26 arranged to be actuated by operating shaft 25. The raising column 26 of the elevating screw 24 supports a pedestal 27 carrying an enlarged platform 28 at its upper end on which the headstock 29 for the chuck 48 (later to be described) is mounted.

Figure 15:
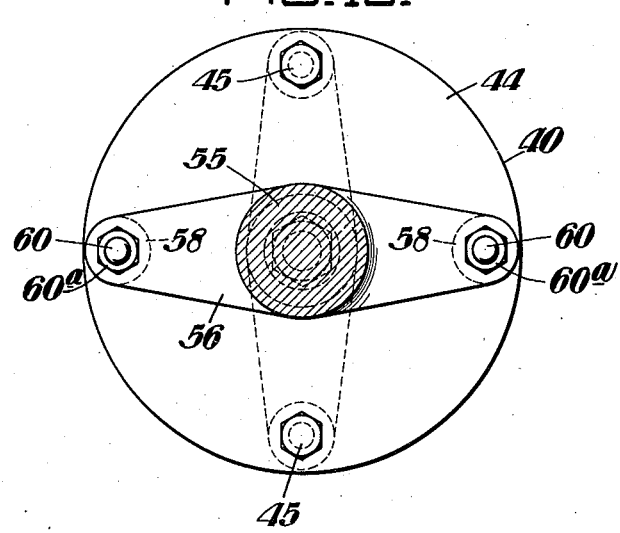

The headstock assembly 29 includes a speed reducer 31 having a drive shaft 38 disposed in axial parallelism with the work. The work is directly engaged by means of a chuck 48 which is connected to the shaft 38 by means of a universal joint, generally designated at 40. The universal joint, which is about to be described, is shown in greater detail in Figures 14 and 15.

The universal joint has been specially designed to afford a limited degree of universal movement without permitting any lost motion setting up between the driven and the driving elements, whereby the torque supplied by the latter is transmitted from the shaft 38 to the chuck 48 without loss. To the end of shaft 38 is secured a T-shaped crosshead 42, the body of the T constituting a hub portion 41 adapted to be secured to the shaft 38. The opposite ends of the head of the T-shaped crosshead are provided with apertured bosses 43 adapted to accommodate bolts 45. Secured thereto by the bolts 45 is a circular disc 44, which is made fast with the former by means of nuts 46.

The chuck 48 has secured to its face, adjacent the drive shaft 38, a disc 52, which is secured thereto by means of bolts 53, and spaced therefrom by washers 50. The discs 44 and 52 are jointed together by a coupling element 55, which is provided at its opposite ends with parallel cross members 56 and 57, respectively. The opposite ends of the cross member 56 are secured to the disc 44 by means of bolts and nuts 60 and 60a, respectively, which are disposed within apertures in the bosses 58 carried by the cross member 56, and through registering apertures located diametrically opposite each other adjacent the periphery of the disc 44, at points falling 90° of arc from the apertures accommodating the bolts 45 of the crosshead 42. The cross member 57 at the opposite end of the coupling member 55 is secured to the disc 52 on the chuck 48 by means of bosses 59, bolts 62, and nuts 63, in a manner, relative to the several parts thereof, similar to that already described in connection with the crosshead 42.

This arrangement is such as will permit a limited universal movement between the several parts by allowing the discs 44 and 52 to be flexed along their diameters falling parallel with the crosshead 42, and cross members 56 and 57, as well as along the diameter of the disc 52 through which the bolts 53 are passed. The discs 44 and 52, being preferably of a stiff material, such as steel, will allow such flexing in affording the universal movement, without, at the same time, permitting any lost motion to occur in transmitting the torque from the driving to the driven elements. The chuck 48 is secured to the end of the roll to be worked upon by conventional, automatically-centering clamps, and rotational effort is applied thereto through the universal joint assembly 40, last described, by means of the shaft 38, which is powered by means about to be described.

Referring once again to Figures 1, 2 and 3, it will be seen that the vertically adjustable platform 28 is extended to accommodate a motor 30 on the far side of the head stock from the universal joint 40. This motor may be of any design capable of infinite speed variation, and susceptible to accurate control and constancy of operation after being set at any given speed. Although any motor meeting these requirements may be employed, a fluid motor has been found to be particularly well adapted for this service. Accordingly, a fluid motor 30 has been indicated in the drawings, to the drive shaft of which is affixed a V-belt pulley 32 adapted to drive another V-belt pulley 34 upon a shaft of the speed reducer 31 by means of a V-belt 33. Inasmuch as it is desirable to effect the drive of the speed reducer with steady rotative effort, free from all vibration and extraneous movement, a fly wheel 35 is secured to the reducer shaft to which the pulley 34 is secured.

The work-piece, which has been illustrated as a rolling mill roll and designated by A in Figure 1, is disposed upon the cradle elements after the latter have been adjusted to afford the 120° bearing upon the periphery thereof, previously described. Inasmuch as this may bring the rotational axis of the roll A slightly above or below the operating axes of the drive shaft 38, and associated elements 40 and 48, the elevating screw 24 is manipulated by means of the shaft 25 to bring the platform 28, carrying the headstock, motor, chuck, and associated devices, into substantial axial alignment with the roll A. The chuck 48 is then made fast to the roll neck by means of the conventional centering clamps (not shown).

In order to determine that the drive shaft 38 and the roll A are in axial alignment, an arm 61 is pivoted for manual oscillation in a horizontal plane to the top of the speed reducer casing so as to extend in the direction of the chuck to overlie the same. The outer end of the arm 61 is provided with a downwardly depending gauge point 61a, which is adapted to engage or pass over the chuck 48 at some peripheral points on the latter. The relation of the lowermost portion of the gauge point 61a to the linear zenith of the circumference of the chuck determines the relative positions of the axis of the shaft 38 to the axis of the roll, or other work, A. Thus, when the horizontal plane, within which the path of movement of the extreme tip of the gauge point 61a falls when oscillated, is exactly tangent to the periphery of the chuck 48 (this will necessarily be at the zenith of the periphery), the shaft 38, and the roll axis, as well as all intermediate parts, will be in substantially coaxial relation. Any slight inaccuracies remaining will be compensated for by the universal assembly 40, described above, and in addition, the latter will assure that the load under which the motor 30 is working will remain absolutely constant, and, that, accordingly, there will be no period of extraneous mechanical movement and vibration, or otherwise, in the machine.

The elimination of such periodic motion, and other extraneous movement, is highly essential due to the nature of the work being done, for reasons that have been mentioned hereinbefore, and which will be more clearly brought out hereinafter, because of the fact that all such motion would be reflected in the form of undesirable patterns on the surface of the work.

*Traversing table*

As will latter appear, it is provided that the work-piece A will be traversed backwards and forwards by rapidly vibrating laps. To effect this bodily traverse of the laps, the entire lapping head assembly is carried on a slidable table, which is constructed and arranged to move parallel to the long axis of the machine, whereby relative movement, from one extremity of the work-surface to the other, between the latter and the laps may be achieved. The following is a description of the construction and operation of this table.

Referring to Figure 2, it will be seen that the upper portion of the housing 2, rearwardly of the closure pan 4, is provided at opposite ends of the machine with upstanding supports 65, providing pairs of aligned apertures in which a pair of stationary, parallel bars 66 is horizontally mounted. These bars 66 constitute a trackway upon which a slidable table 68, of inverted U-shaped cross section, as is more clearly seen in Figure 4, is adapted to ride. By further reference to Figure 4, it will be seen that the ends of the slidable table 68 are provided with two aligned pairs of inverted half-bearings 69, spaced in parallelism, each aligned pair of which is adapted to slide on one of the horizontal bars 66. Note should be made of the fact that the parallel bars 66, which form a trackway upon which the table rides, are purposely of round or cylindrical shape. This insures that oil appearing thereon will drip off, and thus constantly flush dirt and grit therefrom to maintain uninterruptedly, the free movement of the table at all times.

Referring to Figure 10, the slidable table 68 carries a pair of downwardly-depending, longitudinally-aligned, widely-spaced bracket plates 112 which support and close the ends of a longitudinally-disposed, elongated fluid-cylinder 113, which lies between the parallel horizontal bars 66 upon which the table is adapted to slide.

A stationary piston 115 is disposed within the fluid-cylinder 113 and carries a pair of oppositely extending pipes, as at 116 and 117. These pipes 116 and 117 extend, respectively, through the left-hand and right-hand ends of the fluid-cylinder and their bracket plates 112, and are elongated to extend through and project from aligned apertures 118 in cross-members which extend between the housings 65 at the ends of the frame 2 for supporting the parallel horizontal bars 66. Suitable packing is provided between the bracket plates 112 and the pipes 116 and 117, as shown at 121.

Each of the cross-members is vertically apertured, as at 122, right-angularly to intersect the aligned apertures 118 therein. Each end of the frame 2 is provided with a vertical screw-threaded aperture 123 of reduced diameter which communicates with the vertical aperture 122 in the adjacent cross-member. Each of these vertical, screw-threaded apertures 123 is provided with an elongated screw 125, which extends into the vertical aperture 122 with which it communicates. Within each of the vertical apertures 122 in the cross-members there is disposed a slidable block 126, which rests upon the upper extremity of the elongated screw 125 that extends therein. This construction and arrangement of elements permits the adjustment of the longitudinal disposition of the piston 115 in the elongated fluid-cylinder 113.

As will more fully later appear, the construction last described is such as will afford the necessary adjustment to determine the range of traverse of the slidable table, whereby a work-piece of peculiar shape (as an exceptionally long-necked roll) may be accommodated and properly worked upon. The particular piston-securing means described will not injure the external surface of the piston-pipes 116—117; this being of considerable importance in view of the fact that, at some positions of adjustment, the packing in the cylinder's stuffing-boxes will pass over the points of the pipes 116—117 where formerly the clamp blocks and screws 125—126 engaged them. If the external surface of each pipe is not smooth, trouble will be encountered in operating the slide table over different ranges.

The pipes 116—117 are apertured adjacent their ends which are connected to the piston 115, as shown at 129 and 130, respectively. By alternately introducing and exhausting fluid through these apertures, the cylinder 113 is forced to move to and fro, and since the cylinder is secured to the table 68, the latter is moved correspondingly along the horizontal bars 66. The adjustment, already mentioned above, of the piston 115 relative to the stationary parts of the machine assembly will determine the range of movement of the table with respect to the transverse median line of the machine.

As will be seen when the operation of the table-reversing mechanism is discussed, the flexible couplings, whereby fluid pressure is introduced to—and exhausted from—the pipes 116—117, are spared being moved backwards and forwards by the stationary piston-movable cylinder arrangement. This increases the life of the couplings and the operating efficiency of the machine.

Table reversing mechanism

Referring to Figures 8 and 9, the frame 2 carries a pair of longitudinally-aligned, widely-spaced bearings 135 in which there is slidably mounted a bar 136 which lies alongside the inner edge of the inverted U-shaped slidable carriage 68. Immediately below one end of the bar 136 there is disposed a pivoted bell-crank lever 138. On end of the bell-crank lever 138 extends upwardly, is bifurcated, as shown at 139, and provided with a transverse vertically extending elongated U-shaped slot 140 in each of the bifurcations. The adjacent end of the bar 136 is flattened, as shown at 141 and extends between the bifurcated end 139 of the bell-crank lever 138.

The flattened end 141 of the bar 136 carries a transverse pin 142 which extends into the slots 140 in the bifurcations of the bifurcated end 139 of the bell-crank lever 138. The other end of the bell-crank lever 138 extends horizontally and pivotally carries a downwardly depending link 143, the lower end of which is pivotally connected to the operating shaft 144 of a conventional two-way fluid reversing valve 145.

Each of the pipes 116 and 117 is provided on its outer extremity with a tubular cross-head 127. A pipe 128 is connected to each of the cross-heads 127 and extended through a suitable aperture in the adjacent end of the frame 2. Referring to Figure 3, the two-way reversing valve 145 is shown as provided with the pipe 148, which supplies the cylinder pipe 117; and a port 150 that is connected by a flexible tube 151 with the pipe 128, which supplies the cylinder pipe 116. The two-way fluid reversing valve 145 is supplied with fluid through a port 153 by a flexible tube 154.

There is, of course, provided a relief port for the valve, whereby the exhaust fluid may be released and returned to the source of supply. This may be of conventional design, and no specific means for this purpose has been illustrated in the drawings.

The bar 136 is provided on its lower surface at any suitable point intermediate its ends with a pair of immediately adjacent V-shaped cam-notches 156 having sharply inclined walls. Below these cam-notches 156 in the bar 136, the frame 2 is provided with a vertically disposed tube 158 in alignment therewith. This tube 158 carries a cylindrical plug 159, the upper end of which is bevelled, as at 160, snugly to occupy either of the notches 156. The bottom of the cylindrical plug 159 carries a downwardly depending shaft 161, which extends through a pipe plug 162 in the bottom of the tube 158. Between this pipe plug 162 and the bottom of the cylindrical plug 159, the tube 158 carries a coil spring 163, which is disposed exteriorly of the shaft 161 and tends to expand.

The bar 136 carries a longitudinally adjustable, but normally secured, arm 165 which is extended into close adjacency with the inverted U-shaped slidable carriage 68. Adjacent and facing the arm 165 on the bar 136 the inverted U-shaped slidable carriage 68 is provided with an elongated longitudinal T-slot 167. Within this slot 167 there is disposed a pair of stop-members 169, which comprise T-headed bolts 170 having their shank portions extending outwardly therefrom to receive a clamp-nut 171.

As the slidable table 68 approaches the end of its movement in either direction, one of the stop-members 169 in the elongated longitudinal slot 167 contacts and carries the arm 165 on the bar 136 with it for a very limited distance. The bar 136 is thus moved slightly, thereby displacing downwardly the bevelled plug 159 from whichever cam-notch 156 in the bar 136 it happens at the time to be occupying. Since the bevelled cylindrical plug 159 will, in its normal position, repose entirely within one of the notches 156 in the bar 136 by virtue of the expansive force of the coil spring 163, the reciprocative action of the bar 136 will be resisted until the apex of the bevelled plug 159 arrives at "dead-center" position with the apex formed by and between the immediately adjacent notches 156 in the bar 136.

From the foregoing description it will be seen that, were the valve-operating shaft 144 moved simultaneously with the initial movement of the axially-slidable bar 136 before the bevelled plug 159 had passed the dead-center between the notches 156, the valve would be actuated to the half-way point as the plug came to dead-center position, and would thus close both the inlet and exhaust ports at each end of the valve. Obviously, the machine would stop, and become hung in this position. To obviate this difficulty, the linkage somewhere between the slidable bar 136 and the valve operating shaft 144 is afforded a sufficient amount of play, or lost-motion, to prevent the valve shaft 144 from being moved from its original position until the bevelled plug 159 has passed beyond the dead-center point between the cam-notches 156. This may be conveniently accomplished by enlarging the clevis-pin holes in the bifurcated end of the valve operating shaft 144 axially of the latter the requisite amount. By this arrangement, the valve is actuated in a deferred-snap action movement familiar in the art of electric snap-switches.

Upon passing the dead-center position, the bevelled plug 159 is forcefully moved into the adjacent notch 156 in the bar 136 by the expansive force of the coil spring 163 until the registration is completed. This action results in the extremely rapid movement of the bar 136 to its ultimate position. This rapid movement of the bar 136 will, through the bell-crank lever 138, effect the deferred, substantially instantaneous movement of the operating shaft 144 of the two-way fluid reversing valve 145, whereby the energizing pressure of the fluid in the fluid-cylinder 113 is applied to one side of the piston 115, and relieved from the other, so rapidly that the retrogressive movement of the slidable table 168 is effected without any appreciable hesitancy, or "dwell."

Lapping head mounting

For reasons to become more apparent hereinafter, it is desirable to mount the lapping instrumentalities so that they may over-lie the work-piece. The principal reason for this is to enable certain adjustments to be made, in some of which the force of gravity is utilized to attain the correct conditions. As will later appear, the lapping head is so mounted that, when the movement of the table, above described, is taken into consideration, together with the movement of the work-surface, the resulting relative movements afforded between the latter and the laps are, in fact, universal ones. It has already been mentioned that the lapping head mounting is carried by the slidable table 68. The precise construction and functional details of this mounting will now be described.

Adjacent one end of the slidable table 68, there is secured an upstanding vertical post 71, which is adapted to carry the lapping instrumentalities about to be described, and which may be better understood by reference to Figure 5. In this figure, it will be seen that a horizontally-extending, vertically-slidable supporting bracket 73 is carried by the vertical post 71 on the side of the latter adjacent the work-piece, or roll, A. To the inner end of this vertically-slidable support 73 is secured a lug 75, having a vertically-extending, internally screw-threaded bore therethrough, which extends within a vertically disposed slot 76 in the vertical post 71 to project interiorally thereof. The top of the vertical post 71 is provided with an aperture 74 to which the internally screw threaded bore of the lug 75 falls in axial alignment. Journaled within the aperture 74 is a depending elevating screw 77, the threading of which is complementary to the internal threading of the bore of the lug 75, and which extends through the latter to suspend it, and its associated support 73, upon the post 71.

The uppermost and outer end of the elevating screw shaft 77 is provided with a bevel gear 78, which is adapted to mesh with a beveled gear 81 affixed to the inner end of a drive shaft 80, that is journaled within a tubular bearing 79, made fast to the vertical post 71 at right angles to the axis of the elevating screw 77. The outer end of this shaft 80 may be squared to accommodate a hand crank, similar to that shown in dotted lines at 83, in Figure 5, whereby in rotating the shaft 80 in either of two directions, the elevating screw 77 may be rotated either to raise or lower the slidable support 73 carried by the post 71.

As has been mentioned hereinbefore, the slidable support 73 is arranged to carry the lapping instrumentalities. The sliding arrangement for this support is provided to compensate for the uneven wear of the lapping-blocks transversely of the work-piece. This is accomplished by determining which side, and which of the two lapping-blocks, is getting the greater wear, and by either elevating or lowering the vertically slidable support 73 to compensate for this different uneven wear. It will be seen that the raising and lowering of the supports 73 will operate to cant the supporting member of the lapping instrumentalities one way or the other relative to the work-piece. This will be more fully discussed when the operation of the machine is taken up.

As will be seen in a detailed plan view in Figure 12, and as also shows in the more general view, Figures 1, 2, 3 and 7, the vertically-slidable support 73 has secured thereto a lateral tube 85 which extends in parallelism with the axis of the work piece A. A rotatable shaft 87 is journaled in, and extends through, and projects from the lateral tube 85. One end of the rotatable shaft 87 extends through and projects from the vertically slidable support 73 and is suitably secured to one side of an angle-shaped member 89, on the other side of which the lapping head is carried, for reasons to become apparent hereinafter. The opposite end of the rotatable shaft 87 extends through and projects from the outer end of the tube 85 and has secured to its extremity an S-shaped angle bracket 107 (see Figures 5b and 12). To the S-shaped angle bracket is secured, as by nuts and bolts 106, a balance beam 108, which extends at 90° to, and for a substantial distance to each side of, the rotational axis of the shaft 87. The balance beam 108, adjacent its end overlying the work-piece A, is formed upwardly edgewise in the plane of its width to provide an offset portion 108', in the end of which is journaled upon a horizontal axis a small sprocket 110 adapted to be rotated by a counterbalanced hand crank 111. The opposite end of the balance beam 108 is provided with an upstanding section 114 adjacent the upper extremity of which is journaled an idler sprocket 110' in such a position that a line projected through its axis of rotation to the axis of rotation of the sprocket 110 falls parallel to the major axis of the balance beam 108. Tautly suspended between the sprockets 110—110' is a sprocket chain 119, the explanation for which is immediately to follow.

Arranged to slide along the balance beam is a heavy beam weight 120, having bracket fixtures 124 secured thereto to which the opposite ends of the sprocket chain 119 are firmly secured by threaded hooks 131 and nuts 132 by means of which the sprocket chain is maintained taut.

By manipulating the hand crank 111, the sprocket chain 119 may be actuated to slide the beam weight 120 in either direction along the balance beam 108. A calibrated scale rod 133 is secured to the weight for movement therewith, and extends parallel to the balance beam 108, across and beyond the offset portion thereof, to which it is secured for relative sliding movement by means of a shallow U-shaped retaining member 134. The scale rod 133 is calibrated to indicate the position of the weight 120 on the beam 108 relative to the point of fulcrum of the latter, so that the extent of declination, and amount of counterbalancing force necessary to repel such declination, of the balance beam may be read on the scale at the point where the rod 133 passes through the supporting member 134. This arrangement, as will be brought out more clearly hereinafter, is to determine and control the amount of pressures that the lapping-blocks exert upon the surface of the work.

*The lapping head*

Returning now to the opposite end of the rotatable shaft 87, and to the angle member 89 through which the functions of the balance beam 108 and associated beam weight 120 are transmitted to the lapping instrumentalities, these latter are carried upon the other side of the angle member 89 by means of a lateral tube 90, extending in parallelism with the balance beam 108. The housing 190 is attached to the outer end of the lateral tube 90 at which point it is disposed directly to overlie the work-piece A. A rotatable shaft 91 is journaled within the lateral tube 90 and at one of its ends connects with a shaft in the housing 190, as will hereafter be described, and at the other of its ends projects through the angle member 89 to a point of termination closely adjacent the slidable support 73, and the vertical post 71. Upon this latter end of the shaft 91 is secured a belt pulley 93, which is suitably driven, as will hereafter be explained, to constitute the main drive for the lapping instrumentalities.

Referring now to Figures 6, 7 and 12, it will be seen that the housing 190 is secured to the lateral tube 90 by means of a tubular extension 191 having a flanged base portion secured to the housing by suitable fastenings; the extension being telescoped within the end of the tube 90. The arrangement of the lateral extension 191 on the housing 190, and its telescoping relation within the tube 90, is such that the several parts are held firmly together, while permitting the housing 190 to be rotated relative to the lateral tube 90, about an axis corresponding to that of the shaft 91, whereby the angular disposition of the associated parts may be varied relative to the horizontal. As will be more clearly understood when the lapping-blocks and associated mechanism are described, at times, for some unknown reason, an erratic, irregular pattern will commence to show up on the work, and it was found that by altering the pressures longitudinally of the lapping-blocks, which adjustment is made possible by the construction last described, such undesirable patterns could be eliminated, and the work could thereafter be resumed in proper fashion.

Referring particularly to Figure 7, the tool-vibrating mechanism housing 190 is shown as provided with a pair of bearings 193 which are aligned with the tubular lateral extension 191 and the rotatable shaft 91 in the tube 90. A crank shaft 195 is journaled in the bearings 193, and connected, as at 196, to the shaft 91. The throws 197 of the crank shaft 195 are disposed intermediate the bearings 193. The ends of the housing 190 are provided with two pairs of bearing members 199, each pair being aligned longitudinally of the housing and in spaced parallelism with respect to the other pair. Within each aligned pair of bearing members 199 there is mounted a reciprocable shaft 200; the construction and arrangement of shafts and bearing members being such that the former extend below and transversely of the crank shaft 195 at points which are between the throws 197 of the crank shaft 195 and the bearings 193 thereof. At one end of the housing 190 the reciprocable shafts 200 extend through and project therefrom, as shown at 201.

The bearing members are provided with internal wear-resistant bushings 203, and suitable exterior sealing members 204. The high grade bearings are necessary, in view of the great vibrating speeds (5000 revolutions a minute, or more) at which the lapping instrumentalities are operated, to obviate wear and extraneous vibrations resulting therefrom.

The absolute precision required by this type of work makes it imperative to have all parts going into the lapping head, and associated parts, weighed, constructed, arranged and balanced with extreme care. So much time and effort have been spent in reaching the optimum in this regard, and so notable have been the results in minimizing, obviating, or absolutely controlling, all forces and motions surrounding this construction, that, when the mechanism is being normally operated at high speeds, such as that indicated above, an ordinary pencil, if stood on end atop the housing 190, will remain standing indefinitely, or until the operation is completed.

For the foregoing reasons, the cranks 197 of the shaft 195, and all moving parts connected thereto, are arranged 180° apart in a 360° operating cycle so that they will operate in opposite directions simultaneously, and will thus serve to be self-counterbalancing, rendering the entire assembly highly stable and devoid of irregular motion when operating.

Referring to Figures 12 and 13, each of the reciprocable shafts 200 is provided with a pair of parallel, upwardly-extending lugs 206, one of which is enlarged, as at 207, on its upper extremity and carries a vertical stud 208. Each of the throws 197 of the crank shaft 195 carries a connecting rod 210 having its strap-end laterally offset, as shown at 212. The laterally offset strap-ends 212 of the connecting rods 210 extend between the parallel upwardly-extending lugs 206 on the reciprocable shafts 200 and are connected thereto by wristpins 214.

The vertical stud 208 on each of the shafts 200 carries a roller 215. A rectangular plate 217, extending transversely of the housing 190, is bolted, as at 218, to the bearings 193 for the crank shaft 195. This rectangular plate 217 is provided with a pair of parallel elongated slots 219, one being disposed over the vertical studs 208 on each of the shafts 200. These parallel elongated slots 219 provide retainer guides for the rollers 215 on the vertical studs 208; whereby the twisting of the shafts 200 is prevented. It should be noted that this construction is such as to place the rollers 215 and their bearing-slots 219 a substantial distance from the reciprocable shafts 200. This affords the greatest possible leverage for the securing and guiding means to hold the lapping-blocks in proper operating position, and has proved of great importance in precluding "chatter."

The housing 190 is suitably gasketed and provided with lubricant.

Lapping block holders

The projected ends 201 of the reciprocable shafts 200 are coniformly tapered, as shown at 220, and provided with cylindrical ends 221 of reduced diameter which are screw-threaded to receive nuts 222.

Referring to Figure 6, the numeral 225 designates the holder for the lapping-block L of my invention. This lapping-block holder 225 is shown as being rectangular in shape and provided with a right-angular upstanding lug 227 having a transverse coniform aperture 228 therethrough. Thus, each of the coniformly tapered portions 220 of the projected ends 201 of the reciprocable shafts 200 is constructed to receive one of the lapping-block holders 225. It will readily be seen that the coniform taper 220 of the shafts 200 and the coniform apertures 228 in the lugs 227 of the lapping-block holders 225 permit the rotation of the latter, whereby they may be adjusted for proper contact with rolls of varying diameters. In the case of very small rolls, two lapping-blocks are retained, rather than using one block, since the latter arrangement would throw the system out of balance. Special lap-holders for small work to permit the use of the two blocks are, therefore, provided.

The lap-holders shown in Figures 6, 6a and 7 have been especially designed to afford uniformity and smoothness of operation, and to preclude the lapping-blocks from jumping up and down because of any residual outlaw vibrations that might still issue from the machine. This is accomplished by utilizing live rubber under high compression to dampen and absorb extraneous movement.

Referring more particularly to Figure 6a, the lapping-block L, which is of a particular design and material, later to be described, and which embodies the principles of construction disclosed in prior Patents Nos. 2,024,999 and 2,050,054, issued to me on December 17, 1935, and July 7, 1936, respectively, and in my copending application Serial No. 17,320, filed April 19, 1935,—all being entitled "Lapping-blocks"—is soldered into a channel-shaped clamp $L^1$. This clamp is provided with two upstanding cups $L^2$, which have an inturned flange $L^3$ at their upper rims. A splash cap $L^4$ is provided to close the cups $L^2$.

The holders 225 are bored at opposite ends to accommodate clamp bolts L⁵ which are threaded at their upper ends to accommodate adjusting nuts L⁶. The lower ends of the clamp bolts L⁵ are provided with large heads L⁷, between each of which and the splash caps is a spacer bushing L⁸. A rubber washer L⁹ is disposed between the cup flanges L³ and the splash cap L⁴, and beneath this washer, a metal washer L¹⁰ is disposed around the clamp bolt and bushing partially to close the cup L². A large rubber annulus L¹¹ is disposed between the clamp-bolt head L⁷ and the metal washer L¹⁰.

The nuts L⁶ are then set up tightly to place the rubber elements under considerable compression, the total extent of which is determined by the length of the spacer bushings L⁸. The correct length of these bushings will vary for different assemblies and operating conditions, and the only manner of arriving at the precise length is that of empirical observations afforded by the pattern in the work.

Drive for lapping mechanism

As may be seen in Figures 5 and 7, and as has been referred to hereinbefore, the lapping-blocks are vibrated by means of a crank shaft 195, which is driven by a rotatable shaft 91 within the lateral tube 90. The shaft 91 extends rearwardly through the angle member 89, by which the lateral tube is supported on the vertical slide 73 of the vertical post 71. The outer end of the shaft 91 is provided with a belt pulley 93, which is driven in a manner now to be explained.

For reasons that have already been set forth, it becomes necessary at times to raise and lower the lapping instrumentalities, relative to the work-piece on the vertical post 71. This means that the drive arrangement between a source of power and the pulley 93 must be sufficiently flexible readily to adapt itself to the varying positions of this pulley, without impairing the continuity and constancy of operation of the lapping devices. The following arrangement has been found to satisfactorily meet these requirements.

With reference to Figures 2 and 3, it will be seen that the slidable table 68 carries a pedestal 95 adjacent the post 71. Pivoted to this pedestal is a table 96, which has one of its ends hinged to the pedestal so that it can be oscillated from positions parallel to the table 68 at least upwardly 90° to the vertical.

Secured to the oscillatable table 96 is an electric (or otherwise suitably energized) motor 103, to the drive shaft of which is secured a belt pulley 104. An endless drive belt 105 is provided to extend between the pulley 93 of the lapping head drive shaft, and the pulley 104 of the motor, last described. This belt is of such size as to require that the motor table 96 be raised about its pivot from the horizontal upwardly to a diagonal disposition, relative to the table 68 and the vertical posts 71, to reduce the distance between the pulleys 93 and 104 in order that the belt may be passed around them. The tendency of the table 96 to drop back to horizontal position under the weight of the motor is resisted by the endless belt 105, whereby the latter is always uniformly tensioned.

In order that the full weight of the motor will not be carried by the belt, which would tend to subject it to undue stresses, strains and wear, a counter-balancing compression spring 100 is disposed beneath the upper, free end of the motor table partially to cushion the latter. To support the spring, a vertical rod 98 is pivoted to the slidable table 68, as at 97, and extends concentrically through the spring, and upwardly through a registering opening in a part of the motor table 96. The upper end of the rod 98 may be threaded to receive nuts 101, which, though not tightened to force the motor table downwardly against the expansive force of the spring, serve to prevent the several parts from becoming accidently disassembled.

Latch mechanism

The foregoing concludes a general description of the lapping head, and the manner in which it is constructed, operated, driven, and supported. However, before leaving this particular subject, it should be noted that, by virtue of the lapping head's directly overlying the work-support cradles when in operative position, provision must be made to get it out of the way to load and discharge work-pieces, and to inspect the progress of the work. By referring to Figures 5a and 5b, it will become apparent that one way of accomplishing the removal of the lapping head would be by actuating the hand crank 111 to move the beam weight 120 rearwardly of the beam 108 beyond the point of fulcrum of the latter (shaft 87). The head would slowly swing toward the vertical. However, as will later appear when the operation of the machine is discussed, the lapping-blocks must be vibrating when brought down upon the work, and also when removed therefrom. In order to prevent undue twisting of the drive belt 105, the use of the beam and weight for this purpose is avoided until the machine is shut down for a protracted period.

To provide for rapidly raising and positively securing the lapping head at various heights above the work, (see Figures 5a and 5b), a manually-operated latch mechanism is provided. The latch comprises a rigid bar 137 pivoted to the vertical post 71 closely adjacent to, but above and behind, the point of fulcrum of the lapping head and balance beam assembly (shaft 87). Near its forward end, the latch-bar 137 is provided with a pair of spaced slots 137a and 137b, that are formed in the body of the bar to slope downwardly and rearwardly to the lower edge thereof, where they constitute diagonal, parallel notches therein.

Secured to the lapping head adjacent the latch bar is a pin 146, which, due to the shorter radius of the arc of movement of the lapping head about its fulcrum on shaft 87, may be moved to intersect the arcuate paths through which the notches 137a—137b are adapted to be moved. Accordingly, the pin 146 is brought into registration with the forward notch 137a at the lower position, which is just high enough to hold the lapping-blocks clear of the work-surface, but insufficiently high to make any appreciable difference in the drive between the motor 104 and the driven shaft pulley 93. The weight of the lapping head is sufficient to seat the pin forwardly in the notch, at which point it becomes securely hooked. The head is thus locked in position, since the latch-bar is at the forwardmost point of its arcuate path, while the lapping head is not, whereby, if it is to go lower, it must also go forward. The latch-bar, by preventing the forward movement, necessarily prevents the downward movement, thus locking the head in this position.

In this lower position, it will be observed that the latch-bar is afforded positive support by bearing on top of the lateral tube 85, which extends from the vertical post 71.

With the exception of this positive support, the latch-bar performs the same function to hold the head in a higher position (see broken lines Figure 5a) by utilizing the notch 137b. The higher position is desirable when closer inspection of the work or lapping-blocks is necessary, or when the blocks are to be changed. Due to the twist in the belt 105 when the parts are positioned in this manner, the motor 104 is preferably shut-off before the head is raised.

Power and fluid supply systems

Referring to Figure 1, the frame 2 encloses and supports a suitable foundation 175 upon which there is disposed an electric motor 176. The shaft of this motor extends beyond its bearings at each end and connects at its extremities to fluid pumps 178 and 179, respectively.

Each pump has a regulator controlled by shafts 180, which extend through the front of the housing, and their ends are provided with handwheels 181. The fluid pumps are connected to the instrumentalities to be operated thereby, which include the fluid motor 30 and the table-actuating cylinder 113, by means of tubing or conduits 183.

Throttle valves 184, by means of which the devices are started and stopped, are interposed in the conduit system 183 between the pumps and fluid-actuated devices energized thereby. It will be understood that pressure relief valves (not shown) must be employed in the system somewhere between the pumps 178—179 and their respective throttle valves 184, so that, when the latter are actuated to stop the machine, the relief valves will exhaust the fluid pressure by returning the fluid into the supply tank 185 (Figure 3).

Also deserving of mention, though not illustrated in the drawings, are the air-bleeders (not shown) disposed in the fluid system between the pumps and the throttle valves in all instances where the fluid is to actuate cylinder drives, as in the case of the sliding-table drive. Since air is compressible, the accumulation of air that is necessarily trapped in the fluid and formed into bubbles, interrupts the continuous steady operation of the cylinder drives and effects a jerky, sporadic feed thereof.

Any intermittent motion in the operation of the sliding-table would be fatal to the successful operation of the machine, whereby the air-bleeders (fluid baffles and a small dome to receive and trap the released air) are utilized to eliminate this difficulty.

The method

The general construction and arrangement of the parts comprising the apparatus of this invention having been discussed, and their general functions and operations having been partially touched upon, the processes and methods attendant upon their being properly operated will now be taken up.

A work-piece, which has been designated in the drawings as a roll A, is taken up by an overhead crane and brought into position to be lowered into the work-supporting cradles formed by the journal plates 15, rollers 16, 17 and 18, and shafts 6. The lapping head is swung vertically out of the way to permit lowering the roll into position. This may be done by actuating the hand crank 111 to move the scale beam weight 120 rearwardly along the beam 108 beyond the point of fulcrum thereof, or, may be done by raising and holding the lapping head in elevated position by using the latch-bar 137 so as to place lapping head pin 146 in the notch 137b in the latch-bar.

The circumference of the roll having first been ascertained, the cradle elements are adjusted by means of the manually-actuated shaft 10 until corresponding rollers on each of the cradle elements are brought into such relationship as to bear upon the roll's necks at points 120° apart. This operation is facilitated by adjusting the cradle elements after the roll A has been reposed thereon by holding a gauge having a 120° V therein at one end of the cradle elements and by sighting therealong and actuating the shaft 10 until the elements have assumed the proper angularity. It will be understood that only one roller on each of the cradle elements is permitted to engage the roll necks.

As between rolls of greater or lesser diameters, the 120° bearing in the cradle elements may leave the central axis of the roll slightly off-set in a vertical direction from the rotational axis of the chuck 48, head-stock 29, etc., when the latter are arranged coaxially for ideal operating conditions. This vertical mal-alignment, though never excessive, is compensated for by raising or lowering, as the case may be, the head-stock and chuck assembly by actuating the elevating screw 26 by means of the hand operated shaft 25 until the parts are brought into approximate alignment with the roll.

The chuck 48 is then clamped to the roll neck and the oscillatable arm 61 carrying the gauge point 61a is swung to tend to overlie the zenith of the chuck 48. If the roll is too high, relative to the head-stock assembly, the gauge point will strike the chuck 48 before attaining a position over the zenith thereof. If the roll is too low, relative to the head-stock assembly, the space appearing between the tip of the gauge point 61a and the zenith of the chuck 48 will indicate the extent that the head-stock assembly must be lowered before co-axial alignment of the driving and driven parts can be attained. When the tip of the gauge point 61a falls exactly tangent to the periphery of the chuck 48, the roll and the head-stock assembly are in as accurate alignment as the adjustments will permit, and the parts are then in operative position. It will be noted that the movement between the work-piece and the head-stock during these adjusting steps is afforded by means of the universal joint assembly 40.

Lapping-blocks of suitable size and construction are then placed upon the lapping head shafts 200; the holders of the blocks having a coniform taper complementary to that with which the outer ends of the shafts 200 are provided. The lapping head is then lowered until the lapping-blocks L engage the surface of the work for the purpose of determining the proper angle at which the block-holders are carried by the shafts 200. Ordinarily, the axes of the upstanding lugs 227 should coincide with radii of the roll A. This adjustment might first require that the entire lapping head assembly be raised or lowered on the supporting post 71 by actuating the hand crank 83 (Fig. 5) until the proper horizontal elevation is attained. Also, it might be necessary to adjust the lapping head by turning the housing 190 of the latter, and its supporting, telescoping-tube 191, relative to the lateral tube 90 carried by the post 71. It will be evident from the drawings that this gives the proper "heel-toe" bearing of the lapping-blocks upon the work-surface.

After all of the foregoing adjustments have been completed, the lapping head, which, up until now has not been operating, will be raised again from the works' surface so as barely to clear the same, and held in this position by its pin 146 being reposed in the notch 137a of the latch-bar 137.

Since the working-surface of the roll is that portion upon which the lapping operation is carried out, and which the laps are caused to traverse by movement of the sliding table 68 along the horizontal bars 66, it is essential to arrange for the movement of the table accordingly. This is accomplished by setting the stop members 169 at such points along the T-slot 167 so as to trip the arm 165, to move the bar 136, to actuate the reversing valve 145, and, thus, to effect the reversal of the table 68 when the lapping-blocks reach the extremities of the work-surface.

If the shape of the work-piece is such as to dispose the work-surface off-side relative to the transverse median line of the machine, the stationary piston 115 will be adjusted to occupy a position equi-distant from the ends of the movable cylinder 113 when the lapping-blocks are half-way between the extremities of the work-surface. The adjustment of the piston is effected by loosening the screws 125 so as to withdraw the slidable blocks 126 from engagement with the oppositely extending piston tubes 116—117, and by sliding the piston assembly comprising these tubes 116—117, and associated cross heads and pipes 127—128, in a direction paralleling the long axis of the machine, until the proper position of the piston 115 is attained. Thereafter the screws 125 are again set up tightly to cause the slidable blocks 126 to grip the piston tubes 116—117, and, thereafter, to hold them and the associated parts rigidly stationary.

The hand crank 111, carried by the beam weight assembly on the lapping head, is then actuated to bring the beam weight sufficiently forward relative to the point of fulcrum (shaft 87) of the lapping head assembly and balance beam to afford the desired pressure that the lapping-blocks are to exert upon the work-surface. This amount of pressure is predetermined, and is attained by adjusting the beam weight until the proper reading is had on the calibrated scale rod 133 at the point at which it passes through the rod support 134 on the balance beam 108.

Up to this point, none of the moving parts has been set in operation. However, everything being now ready, the main motor 176 in the base of the machine is started to actuate the associated fluid pumps 178—179, which are connected to its shaft. The fluid motor controls actuated by the shafts 180 are then adujsted properly to cause the correct amount of fluid to be pumped from the supply tank into the main operating systems. However, so long as the valves 184 remain closed, the fluid pressure is exhausted into the supply tank 185 and recirculated through this shunt system by the motors until the operation of the various parts of the machine is desired.

At this point the valve 184, appearing to the left-hand side of the machine in Figure 1, is opened to rotate the work-piece A at the speed determined by the set of the control shaft 180. As will be explained below, it is customary to initiate the lapping operation by rotating the work-piece at an extremely low speed. For this reason, only a sufficient amount of fluid is pumped from the pump 178 and admitted through the valve 184 up to the fluid motor 30 to effect the slow drive of the roll A through the speed reducer 31, the universal joint 40, and the chuck 48.

At this point the abrasive, which is loose and not a part of the lapping-blocks, per se, is applied to the work in the following manner: A thin solution of a lubricant, a scavenging liquid and a finely powdered abrasive (the grain of which will remain suspended in still water from 200 to 600 minutes, depending on the size needed) such as, levigated aluminum oxide, green chrome oxide, lens powder, soft silica, crystalline magnesia, or other levigated powder used in metallography, is already mixed and is "painted" onto the work-surface preparatory to energizing and setting the lapping-blocks thereon. This solution is such as to provide a covering film upon the work surface of a thickness substantially approximating that of one grain of the abrasive. As has been explained hereinbefore, this is made possible by the scavenger used in conjunction with the lubricant. The scavenger tends to disperse the colloidal particles, and, thus, to create an ideal operating conditioning which has never heretofore been obtained in endeavoring to lap with loose abrasives.

Cutting conditions may be altered so as to give different finishes by employing different types of lapping block material, such as are disclosed in my prior patents and application referred to hereinbefore, and as is further set forth in my copending application, Serial No. 267,127, filed April 10, 1939, as well as by varying the grain size and character of the abrasive used. Similarly, different cutting conditions may be obtained by varying the type of lubricant and/or scavenger used. A relatively heavy, viscous lubricant will encase the grain and tend to cushion the block upon the work-surface to minimize the cutting action; while, a light, thin lubricant will maintain the grain in its most effective condition as a rapid cutting medium, and the extent and speed of the operation will be greatly augmented thereby. Examples of lubricants ranging from the heavier to the lighter grades are: mineral oil, water, kerosene and vinegar. Examples of the scavenging agents that may be used in conjunction with these lubricants for dispersing the grain, diluting the lubricant, and rendering the cutting action more effective, are: butyl acetate, and tri-sodium phosphate. The former is miscible with both water and oil, whereas the latter is soluble in water and tends to emulsify with oil. In either case, these agents are effective in maintaining the proper cutting conditions at the work zone.

The motor 103 is then energized to drive the lapping instrumentalities at a high rate of speed. This drive is transmitted from the motor 103 through its shaft pulley 104 to the pulley 93 mounted on the lapping head drive shaft 91 by means of the belt 105. The drive shaft 91 transmits the drive from the motor 103 through coupling 196 to the crank shaft 195 journaled within the lapping head housing 190. The cranks 197 of the shaft 195 are, through the connecting rods 210, caused to reciprocate the lap-holding shafts 200 very rapidly, whereby the latter are vibrated at a frequency in the order of 5,000 revolutions per minute.

The head is then raised sufficiently to become released from the latch-bar 137 and is permitted gently to engage the work-surface to which the loose abrasive has already been applied in the manner above described. It should be noted that the lapping-blocks are started before engaging the work. It was found that by doing otherwise, an undesirable condition was created due to the factors present at such time being different from the constant factors of continuous operations. Hence, the blocks are started and stopped while out of engagement with the work.

Instantly thereafter, the valve 184, apearing to the right-hand side of the machine in Figure 1, is opened the prescribed amount to pass fluid from the supply tank 185 through the fluid motor 179, flexible tubes 148, pipes 128, cross heads 127, to either of the piston tubes 116 and 117, depending on the initial disposition of the table. Here the fluid pressure enters into the cylinder 113 on that side of the piston 115 from which the pressure has been introduced. The piston's being stationary, and the fluid's being substantially non-compressible, are responsible for the cylinder's being moved in the direction from whence the fluid pressures comes. The cylinder, being rigidly affixed to the table 68, causes it to follow along the horizontal bars 66 until the reversing mechanism is actuated by the arm 165 engaging the stop member 169, at which position of the table, the lapping-blocks will be at one extremity of the work-surface.

The rapid vibrations of the lapping-blocks in a direction parallel to the longitudinal axis of the machine, the counter movement of the rotating work-piece, and the additional movement of the traversing table 68 to move bodily the laps along the work-surface, all combine to give a certain type of cut upon the latter. The characteristics of such a cut, as has already been brought out hereinbefore, are referred to as the "pattern," about which a word of explanation will now be given.

*Pattern*

As was mentioned in the forepart of this specification, a newly ground roll, due to the manner in which the polishing is necessarily carried out, shows circumferential scratches or cuts of varying depth. Thus, it is always possible to tell at a glance whether or not any treatment other than polishing has been given the work-surface of the roll.

It is the purpose of lapping to apply the direction of cut from as many angles as possible in order that the abrasive grain will not track in the previous cuts, and so that a surface may be developed that is the result of an infinite number of averages of cuts taken in all directions.

Therefore, it is frequently desirable to apply the lapping cuts to a newly ground roll; i. e., one having a circumferential pattern, in a direction so as to cross the previous cuts at as great an angularity up to 90° as is feasible. In the present case, this is done by rotating the roll very slowly and by rapidly vibrating the laps axially of the roll while causing them to traverse across the work's surface thereof moderately fast. This disposes new cuts, and lays the grain down, parallel to the roll axis. This is continued until all of the marks resulting from the grinding operation have disappeared and in their stead appear much finer marks extending approximately axially of the roll.

As soon as the first lapping marks, last described, have become well established in the surface, and microscopic examination reveals absolutely no marks remaining from preceding operations, it is usual to provide that the next cut be applied in a direction that represents the resultant of the two former cuts, which, in this case, would represent substantially a 45° angle relative to the roll axis. This is effected by speeding up the rotation of the work-piece relative to the rate of traverse of the sliding-table, and, also, relative to the vibratory speed of the laps, which might be, in some instances, advantageously slowed down. The result of these speed relationships is such as to lay the grain down at 45° angles to the roll axis and to the preceding cuts. Ultimately these cuts obliterate the old marks and themselves become prevalent as the pattern of the work-piece.

The speed relationships are again changed to get still another direction of cut at some substantial angularity to the one immediately preceding, and ultimately the lapping-blocks may be induced to perform in a well-rounded, sinuous path upon the surface of the work, variations in the pitch of which path may be had by the same controls hereinbefore described.

In this manner, the surface is taken down to the absolute bottom, which was mentioned in the forepart of this description, beneath which only sound metal lies. When this stage is reached, the surface will be that which will be characterized as an absolute mirror and the pattern thereof will have become so fine as to be substantially imperceptible.

From the foregoing it will be appreciated that the pattern plays a large part in keeping the operator informed as to how the work is progressing, and as to what his subsequent procedure must be in arriving at the ultimate finish as expeditiously as possible. There are times when the 90° cut, with reference to the cut immediately preceding, may not be the most desirable one for the results contemplated, and it is not intended to give the impression herein that this strictly is the only procedure to be followed, or that of which the machine is alone adapted to give. It must be understood that the work may be traversed in any direction at any time during the operation to afford any particular results desired. The variations are effected by changing the speed relationships of the traversing table, the rotation of the work-piece, the speed of vibration of the laps; also by changing the pressures to which the laps are subjected against the surface of the work-piece, the particular size, shape, and material of which the lap itself is composed, and the size and character of the abrasive used.

Though the inventions are thought to be well illustrated by the descriptive matter hereinbefore set forth, such description, replete as it is with specification and detail, is not to be confounded with the scope of the inventions; for it is recognized that many modifications may be made, which will depart from the letter of this specification, but which clearly will partake of the spirit of these inventions, as is thought to be apprehended in and by the following claims.

I claim:

1. In a machine for surface-treating articles: a work-piece support comprising a pair of parallel shafts; a pair of cradle elements supported by each shaft; said cradle elements being slidable along their respective shafts to vary the distance at which one is disposed to the other thereon; and means for moving the pair of cradle elements on one shaft relative to the cradle elements on the other shaft to vary the distance therebetween.

2. In a machine for surface-treating articles: a work-piece support comprising a pair of parallel shafts; a pair of cradle elements supported by each shaft; said cradle elements being rotatable about the axes of their respective shafts, and having work engaging bearings disposed at different distances from said axes; means for rotating said elements to bring the corresponding work engaging bearing of each into proximate relationship, and means for retaining the elements in such position.

3. In a machine for surface-treating articles: a support adapted to accommodate cylindrical articles comprising a pair of parallel shafts; a plurality of work engaging bearings carried by each of said shafts; each bearing on each shaft being arranged at a fixed distance therefrom different from that of the other bearings; means for effecting simultaneous adjustment between the plurality of bearings on both shafts to bring one bearing element of the plurality upon each shaft into engagement with the cylindrical object to be accommodated; the bearing elements and associated shafts, being constructed and arranged so that certain planar radii of the cylindrical object disposed substantially 120° apart, when produced, pass through the axes of said shafts, and through the points of contact of the bearing elements in engagement therewith.

4. In a machine for surface-treating articles: work rotating means comprising a vertically movable platform; a driveshaft secured to said platform; work engaging means arranged for rotation with said shaft by a universal coupling; said universal coupling being characterized by its ability to transmit without lost motion all torque from the driving to the driven elements, while being adapted to compensate for axial misalignments therebetween; and a fly-wheel associated with said driven shaft to eliminate differences in the rotational speed thereof, and to dampen extraneous motion.

5. In a machine for surface-treating articles: work rotating means comprising a vertically movable platform; a driven shaft secured to said platform; work engaging means arranged for rotation with said shaft by a universal coupling; means for adjusting said platform to bring said driven shaft into axial alignment with a work-piece, when the latter is engaged by said work engaging means; and a horizontally-swingable arm associated with said platform for determining when such axial alignment is achieved.

6. In a machine for surface-treating articles: work rotating means comprising a vertically movable platform; a driven shaft secured to said platform; a variable speed motor arranged in driving relation to said shaft; a fly-wheel associated therewith to render the rotation of said driven shaft uniform at any speed; work engaging means connected to said shaft by a universal joint; and gauging means for determining when the platform is at the proper elevation operably to position said work engaging means, driven shaft, and associated parts, in axial alignment with a work-piece.

7. A lapping mechanism comprising a housing; stationary slide bearings in said housing; a pair of reciprocable shafts; levers right-angularly disposed to said shafts, and rigidly affixed thereto, in engagement with said slide bearings to prevent rotation of said shafts during the reciprocation thereof; and anti-friction means disposed between said levers and said slide bearings.

8. In a machine for surface-treating articles: a support for accommodating cylindrical objects, and for retaining such objects against axial movement; a variable speed, constant torque drive for rotating an object supported in said support means; a table for traversing to and fro in directions parallel to the axis of an object positioned in said support means; a vertically-adjustable lapping device carried by said traversing table; lapping instrumentalities pivotally carried on said vertically-adjustable support by an oscillatable arm to overlie the work-piece, said lapping mechanism including a pair of lapping blocks adapted to be rapidly vibrated in engagement with the surface of the work-piece; means for controlling the speed of rotation of the work-piece, the speed of traverse of the table on which the lapping instrumentalities are carried, and the speed of vibration of the lapping blocks, to vary the directional paths in which said blocks travel over any given portion of the surface of said work-piece.

9. In a machine of the class described, means for rotatably supporting a cylindrical body, a vertically-movable support, an oscillatable arm carried by said vertically-movable support, a housing pivoted on the outer end of said oscillatable arm, means for permitting the partial rotation of the housing with respect to the longitudinal axis of the arm, a plurality of tools carried by said housing, said tools being arranged to bear against said cylindrical body, means for imparting rapid opposite reciprocatory vibrations to said tools in directions substantially axially of said cylindrical body, means for moving said housing and said tools along said cylindrical body, and means for rotating said cylindrical body whereby its surface is moved in directions other than parallel to the reciprocatory movements aforesaid.

FOSTER F. HILLIX.